US012256670B2

(12) United States Patent
Christiansen et al.

(10) Patent No.: US 12,256,670 B2
(45) Date of Patent: Mar. 25, 2025

(54) HARVESTER SYSTEMS AND METHODS FOR AUTOMATED AND SEMI-AUTOMATED FILLING OF BINS OF RECEIVING VEHICLES

(71) Applicant: AGCO International GmbH, Neuhausen (CH)

(72) Inventors: Martin Peter Christiansen, Randers (DK); Esma Mujkic, Randers (DK); Ramon Buchaca Tarragona, Randers (DK); Morten Stigaard Laursen, Randers (DK); Kenneth Düring Jensen, Randers (DK); Morten Leth Bilde, Langaa (DK)

(73) Assignee: AGCO International GMBH, Neuhausen (CH)

( * ) Notice: Subject to any disclaimer, the term of this patent is extended or adjusted under 35 U.S.C. 154(b) by 314 days.

(21) Appl. No.: 17/820,479

(22) Filed: Aug. 17, 2022

(65) Prior Publication Data
US 2023/0113645 A1     Apr. 13, 2023

(30) Foreign Application Priority Data

Oct. 12, 2021  (GB) ...................... 2114575

(51) Int. Cl.
*A01D 41/127*   (2006.01)
*A01D 41/12*    (2006.01)

(52) U.S. Cl.
CPC ..... *A01D 41/1275* (2013.01); *A01D 41/1217* (2013.01); *A01D 41/1278* (2013.01)

(58) Field of Classification Search
CPC . A01D 41/1275; A01D 43/073; A01D 43/087
(Continued)

(56) References Cited

U.S. PATENT DOCUMENTS

| 5,575,316 A | 11/1996 | Pollklas |
| 9,408,347 B2 | 8/2016 | Menke et al. |

(Continued)

FOREIGN PATENT DOCUMENTS

| EP | 2020174 A1 | 2/2009 |

OTHER PUBLICATIONS

UK Intellectual Property Office, Search report for related UK Application No. GB2114575.0, dated Jul. 21, 2022.

*Primary Examiner* — Todd Melton
*Assistant Examiner* — Vincent Feng

(57) ABSTRACT

Described herein are technologies that use LIDAR and computer vision to detect a location of a receiving vehicle relative to a forage harvester, fill levels of crop material within the receiving vehicle, and path and landing position of material expelled from the forage harvester and received by a bin of the receiving vehicle. The technologies use such information as feedback for operating the harvester or the receiving vehicle. Some embodiments detect ground level in front of the harvester or the receiving vehicle, and such information is used as feedback too. Some embodiments include a link to communicate the feedback to a GUI for user visualization of the feedback and semi-automated operations of the harvester or the receiving vehicle. For example, readings from LIDAR and a camera of the harvester detect a topography of the material deposited in the bin of the receiving vehicle, and a GUI outputs the topography.

4 Claims, 23 Drawing Sheets

(58) Field of Classification Search
USPC .......................................................... 701/50
See application file for complete search history.

(56) References Cited

U.S. PATENT DOCUMENTS

| | | | |
|---|---|---|---|
| 10,194,587 B2 * | 2/2019 | Hien | A01D 43/087 |
| 2013/0211675 A1 | 8/2013 | Bonefas | |
| 2014/0083556 A1 | 3/2014 | Darr et al. | |
| 2017/0042089 A1 * | 2/2017 | Bonefas | H04N 13/204 |
| 2018/0047177 A1 | 2/2018 | Obropta et al. | |
| 2020/0133262 A1 * | 4/2020 | Suleman | G05D 1/0278 |
| 2020/0214205 A1 | 7/2020 | De Smedt et al. | |

* cited by examiner

HARVESTER SYSTEMS AND METHODS FOR AUTOMATED AND SEMI-AUTOMATED FILLING OF BINS OF RECEIVING VEHICLES

TECHNICAL FIELD

The present disclosure relates to systems and methods for detecting crop material path and landing position of a harvester output, and specifically, for example, systems and methods for detecting crop material path and landing position of a forage harvester output. Some embodiments relate to forage harvester systems and methods for automated and semi-automated filing of bins of receiving vehicles.

BACKGROUND

Harvesters, such as forage harvesters, are used in agricultural production to cut or pick up crops from a field. In the case of forage harvesters, a harvester cuts and picks up forage plants and then dispenses the cut plants to a wagon. The harvested forage plants are made into silage.

Forage harvesters can be implements attached to a tractor or be self-propelled machines. Forage harvesters can include a drum or a flywheel with blades that chop and blow the cut crop out of a chute of the harvester into a wagon that is either connected to the harvester or to another vehicle moving the wagon alongside the harvester. Forage harvesters can have paddle accelerators to increase the flow of the forage harvester output. Once filled, the wagon can be unloaded and the unloaded silage can be stored. Corn and grass require different types of cutting equipment; thus, there are different heads for each type of crop, and in some examples, the heads are attachable and detachable from the harvester.

To avoid stopping during a harvesting operation, a forage harvester unloads the crop while the harvester is in motion harvesting crop. Unloading the forage harvester while it is in motion requires a receiving vehicle to drive alongside the harvester during the unload operation. This requires the operator driving the receiving vehicle to align a bin of the receiving vehicle with the spout of an unload conveyor of the forage harvester for the duration of the unload operation. Aligning the two vehicles in this manner is laborious for the operator of the receiving vehicle and, in some situations, can be particularly challenging. Some circumstances may limit the operator's visibility, for example, such as where there is excessive dust in the air or at nighttime. Furthermore, if the receiving vehicle has a large or elongated bin it is desirable to shift the position of the bin relative to the spout during the unload operation to evenly fill the grain bin and avoid spilling grain.

Another type of harvester is a combine harvester. Combine harvesters also process crop but function differently from forage harvesters. A combine harvester separates grain from material other than grain (MOG), such as stalks, leaves, and husks; whereas, forage harvesters chop the entire plant—including grain and MOG—into small pieces for storage and feeding to livestock. Combine harvesters may store the processed crop onboard the harvester during the harvest operation, rather than transfer the processed crop to a receiving vehicle by blowing the crop material through a discharge chute to the receiving vehicle during the harvesting operation. However, similar to forage harvesters, some combine harvesters may also transfer the processed crop to a receiving vehicle by blowing the crop material through a discharge chute to the receiving vehicle during the harvesting operation. Thus, a receiving vehicle must closely follow such a combine harvester during the entire harvester operation. This presents similar challenges to those discussed herein in relation to the forage harvester.

The above section provides background information related to the present disclosure which is not necessarily prior art.

SUMMARY

Described herein are technologies (such as systems, apparatuses, and methods) for light detection and ranging (LIDAR) detection of path and landing position of crop material expelled from a forage harvester to be received in a receiving vehicle that moves alongside the harvester. Also, described herein are technologies for use of such information as feedback for operating the harvester or the receiving vehicle. In some embodiments, a LIDAR system detects path and landing position of crop material expelled from a spout of a discharge chute of the harvester, and a control system uses such data to control the spout, so that the chute and spout are configured to direct the material to a bin moved by the receiving vehicle. In some embodiments, an IMU is mounted with the LIDAR system to or near the spout to determine ground speed of the spout, and the detected path and position as well as the determined speed of the spout is used as feedback to control the discharge chute or the speed of the harvester or the receiving vehicle.

Also, described herein are technologies that use LIDAR and computer vision to detect a location of a receiving vehicle relative to a forage harvester, fill levels of crop material within the receiving vehicle, and path and landing position of material expelled from the forage harvester and received by a bin of the receiving vehicle. The technologies use such information as feedback for operating the harvester or the receiving vehicle. Some embodiments detect ground level in front of the harvester or the receiving vehicle, and such information is used as feedback too. Some embodiments include a link to communicate the feedback to a graphical user interface (GUI) for user visualization of the feedback and semi-automated operations of the harvester or the receiving vehicle. For example, readings from LIDAR and a camera of the harvester detect a topography of the material deposited in the bin of the receiving vehicle, and a GUI outputs the topography.

Also, described herein are technologies that use LIDAR and computer vision to detect locations of receiving vehicles grouped together relative to a forage harvester as well as to detect fill levels of crop material within each receiving vehicle and path and landing position of material expelled from the harvester into a bin of a receiving vehicle of the group. Such information is used as feedback for operating the harvester or one or more self-propelled vehicles moving the receiving vehicles. Some embodiments detect ground level in front of the harvester or the receiving vehicles and use such information as feedback too. Some embodiments include a link to communicate the feedback to a GUI for user visualization of the feedback and semi-automated operations. For example, readings from LIDAR and a camera of the harvester detect a position and a crop material fill level for each receiving vehicle in the group of receiving vehicles, and the GUI outputs the information.

In providing detecting crop material path and landing position of a harvester output and using such information for feedback control as well as providing forage harvester systems and methods for automated and semi-automated filing of bins of receiving vehicles, the technologies described herein overcome some technical problems in farming of crops and specifically some technical problems in harvesting crops and aligning harvester output with a bin of a receiving vehicle. Also, the techniques disclosed herein provide specific technical solutions to at least overcome the technical problems mentioned in the background section and other parts of the application as well as other technical problems not described herein but recognized by those skilled in the art.

With respect to some embodiments, disclosed herein are computerized methods for detecting crop material path and landing position of a harvester output and using such information for feedback control as well as for automated and semi-automated filing of bins of receiving vehicles by the harvester, as well as a non-transitory computer-readable storage medium for carrying out technical operations of the computerized methods. The non-transitory computer-readable storage medium has tangibly stored thereon, or tangibly encoded thereon, computer readable instructions that when executed by one or more devices (e.g., one or more personal computers or servers) cause at least one processor to perform a method for detecting crop material path and landing position of a harvester output and using such information for feedback control as well as for automated and semi-automated filing of bins of receiving vehicles by the harvester.

These and other important aspects of the invention are described more fully in the detailed description below. The invention is not limited to the particular methods and systems described herein. Other embodiments can be used and changes to the described embodiments can be made without departing from the scope of the claims that follow the detailed description.

BRIEF DESCRIPTION OF THE DRAWINGS

The present disclosure will be understood more fully from the detailed description given below and from the accompanying drawings of various embodiments of the disclosure.

DETAILED DESCRIPTION OF EXAMPLE EMBODIMENTS

Details of example embodiments of the invention are described in the following detailed description with reference to the drawings. Although the detailed description provides reference to example embodiments, it is to be understood that the invention disclosed herein is not limited to such example embodiments. But to the contrary, the invention disclosed herein includes numerous alternatives, modifications and equivalents as will become apparent from consideration of the following detailed description and other parts of this disclosure.

Figure 1:
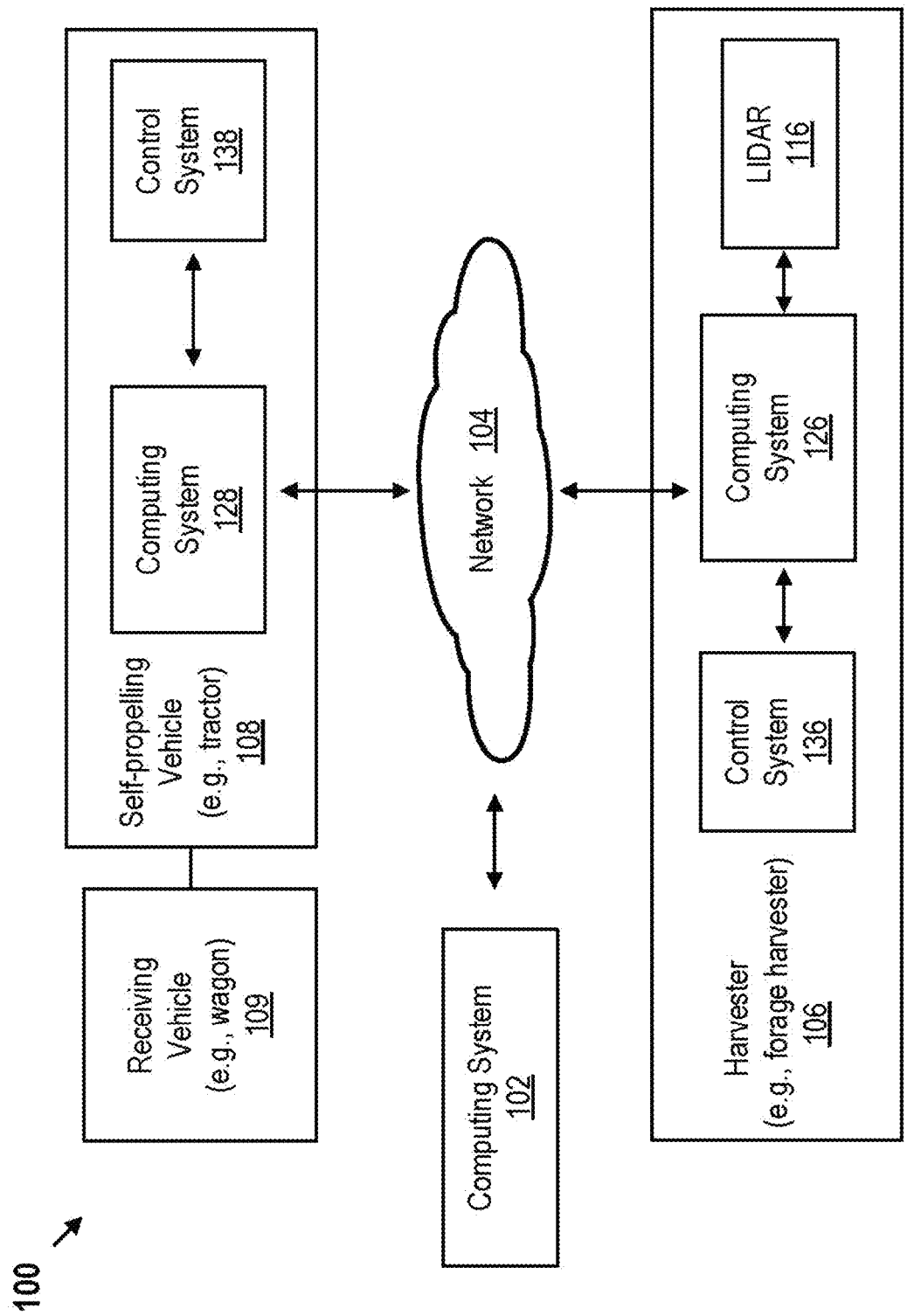
FIG. 1 illustrates an example network of agricultural vehicles as well as systems and apparatuses that provide for detecting crop material path and landing position of a harvester output and using such information for feedback control, in accordance with some embodiments of the present disclosure.

FIG. 1 illustrates network 100 including multiple computing systems (e.g., see computing system 102, 126, and 128), a communication network 104, and agricultural vehicles, e.g., see harvester 106, self-propelling vehicle 108, and receiving vehicle 109). The harvester 106 can be a forage harvester or a combine harvester. In examples where harvester 106 is a forage harvester, it can be a self-propelling forage harvester or a forage harvester attachable to a tractor. The receiving vehicle 109 can be a receiving vehicle or a wagon or part of the self-propelling vehicle 108. In the example, where the receiving vehicle 109 is part of the self-propelling vehicle 108, the receiving vehicle is essentially a self-propelling vehicle. The self-propelling vehicle 108 can be a tractor or a truck or another type of self-propelling vehicle. As shown, the self-propelling vehicle 108 includes a computing system 128 and a control system 138. In some embodiments, the computing system 128 and the control system 138 are systems of the receiving vehicle 109 as well. Also, as shown, the harvester includes a light detection and ranging (LIDAR) system 116, the computing system 126, and the control system 136. The computing system 102 is remote to the harvester and the other agricultural vehicles and can provide the functionality of computing systems 126 and 128 remotely (i.e., remote computing for the vehicles).

The communication network 104 includes one or more local area networks (LAN(s)) or one or more wide area networks (WAN(s)). In some embodiments, the communication network 104 includes the Internet or any other type of interconnected communications network. In some embodiments, the communication network 104 includes a single computer network or a telecommunications network. In some embodiments, the communication network 104 includes a local area network (LAN) such as a private computer network that connects computers in small physical areas, a wide area network (WAN) to connect computers located in different geographical locations, or a middle area network (MAN) to connect computers in a geographic area larger than that covered by a large LAN but smaller than the area covered by a WAN.

In some embodiments, the agricultural vehicles of the network 100 are connected to the Internet and the communication network 104 includes the Internet. In such examples, the agricultural vehicles are Internet of Things (IoT) devices.

Not depicted in FIG. 1, the network 100 can include various types of sensors (e.g., see LIDAR system 116). In some embodiments, the sensors also include cameras, position sensors, linear displacement sensors, angular displacement sensors, pressure sensors, load cells, or any other sensor useable to sense physical attributes and locations of agricultural vehicles, such as physical attributes related to steering or driving of a vehicle or moving or adjusting a chute of a harvester.

As shown, at least each shown component of the network 100 (including computing systems 102, 126, and 128, communication network 104, harvester 106, vehicles 108 and 109, control systems 136 and 138, and LIDAR system 116) is or includes or is connected to a computing system that includes memory that includes media. The media includes or is volatile memory components, non-volatile memory components, or a combination of thereof. In general, each of the computing systems includes a host system that uses memory. For example, the host system writes data to the memory and reads data from the memory. The host system is a computing device that includes a memory and a data processing device. The host system includes or is coupled to the memory so that the host system reads data from or writes data to the memory. The host system is coupled to the memory via a physical host interface. The physical host interface provides an interface for passing control, address, data, and other signals between the memory and the host system.

Some embodiments include an apparatus that includes a LIDAR system (e.g., see LIDAR system 116), a computing system (e.g., see computing system 102 or 126), and a control system (e.g., see control system 136). The LIDAR system of the apparatus is configured to scan in coordinates of parts of a receiving vehicle (e.g., see receiving vehicle 109) as well as scan in coordinates of a distribution of crop material in the receiving vehicle (such as coordinates of a distribution of crop material in a bin of the receiving vehicle). The LIDAR system is also configured to scan in a crop material flow expelled from a spout of a discharge chute of a harvester (e.g., see harvester 106) near the receiving vehicle (e.g., see receiving vehicle 109). E.g., see the LIDAR field of view enclosed by dashed lines 430a and 430b as well as 430c and 430d, respectively.

Figure 4:
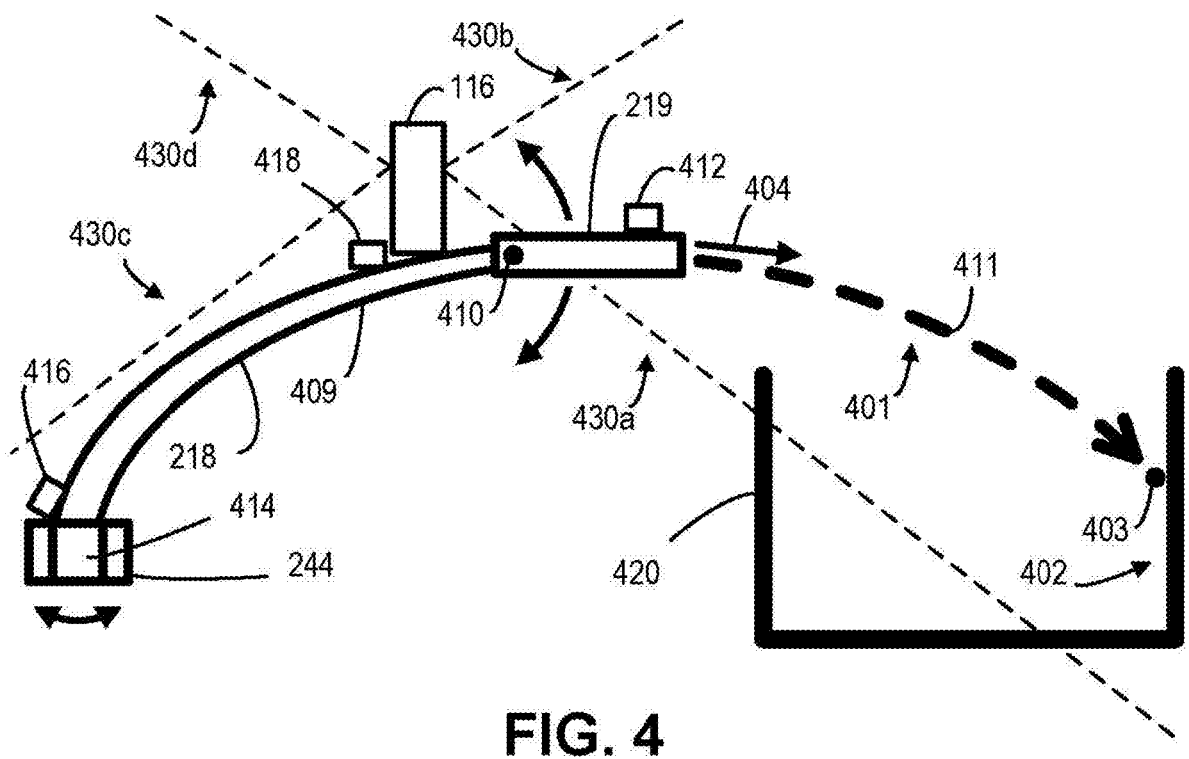
FIGS. 4 and 5 illustrate side views of two different embodiments of the discharge chute of the forage harvester shown in FIGS. 2 and 3, with some portions of the forage harvester and the receiving vehicle being broken away or completely removed to reveal some internal details of construction, in accordance with some embodiments of the present disclosure.
Figure 5:
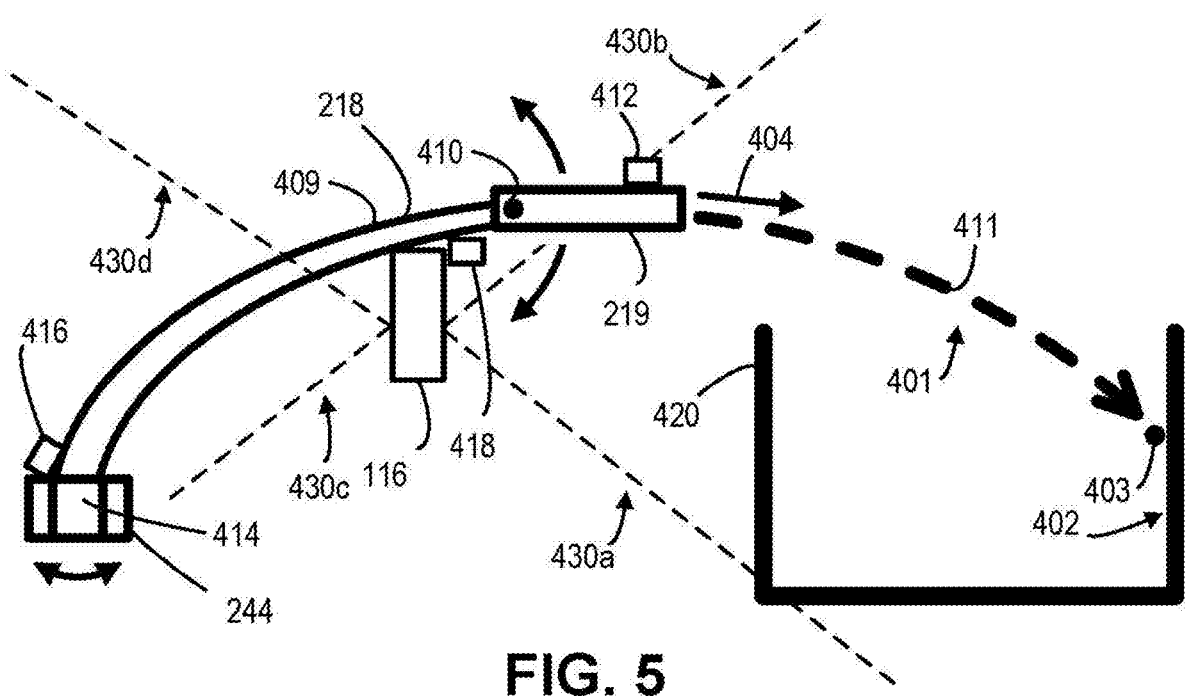

The computing system of the apparatus is configured to determine a crop material path by extrapolating points along an arc formed by the scanned in crop material flow (e.g., see crop material path 401 and point 411 shown in FIGS. 4 and 5). The computing system is also configured to determine boundary parameters of a bin (e.g., see bin 420 shown in FIGS. 4 and 5) of the receiving vehicle based on the scanned in coordinates of the parts of the receiving vehicle and the scanned in coordinates of the distribution of crop material in the receiving vehicle. The computing system is also configured to determine an inner surface within the determined boundary parameters as well as determine a landing point of the scanned in crop material flow by curve fitting the determined crop material path to a point of intersection with the determined inner surface (e.g., see inner surface 402 and landing point 403 shown in FIGS. 4 and 5).

The control system of the apparatus is configured to control a discharge direction of the spout of the discharge chute of the harvester (e.g., see discharge direction 404). The discharge direction is a direction in which the spout expels crop material. The control of the discharge direction is at least partially based on the determined landing point and a target landing point of crop material. And, the computing system is configured to determine control parameters of parts of the discharge chute to control the discharge direction based on the determined landing point and the target landing point-which in turn are used by the control system to control the chute. In some embodiments, the target landing point is a predetermined point based on a predetermined level of crop material in the bin of the receiving vehicle, and the predetermined level of crop material is based on the determined boundary parameters of the bin. The determined landing point is an estimated impact point between expelled crop material and the determined inner surface.

In some embodiments and as shown in FIG. 1, the apparatus is part of the harvester. And, in such embodiments, the apparatus includes the discharge chute and the LIDAR system is mounted to the discharge chute. In some embodiments, the discharge chute is configured to pivot on the harvester horizontally. In such embodiments and others, the LIDAR system is mounted above the spout of the discharge chute (e.g., see FIG. 4). In alternative embodiments, the LIDAR system is mounted below the spout of the discharge chute (e.g., see FIG. 5). In some embodiments, the LIDAR system is mounted above or below the spout of the discharge chute, and an inertial measurement unit (IMU) is mounted with LIDAR system above or below the spout (e.g., see IMU 418).

In some embodiments, the discharge chute includes a joint that is configured to join the spout to an arm portion of the discharge chute (e.g., see joint 410 and arm portion 409 shown in FIGS. 4 and 5). The chute also includes a position feedback sensor on or near the joint, configured to sense a position of the spout relative to the arm portion of the discharge chute (e.g., see position sensor 412 shown in FIGS. 4 and 5). The control of the discharge direction, by the control system, is further based on the sensed position of the spout. And, the computing system is configured to determine a control parameter of the joint based on the sensed position of the spout, the determined landing point, and the target landing point.

In some embodiments, the joint is a first joint and the position feedback sensor is a first position feedback sensor. And, the discharge chute includes a second joint that is configured to join the arm portion to a base portion of the discharge chute (e.g., see joint 414 and base portion 244 shown in FIGS. 4 and 5). The base portion of the discharge chute is attached to a main body portion of the harvester. The chute also includes a second position feedback sensor on or near the second joint that is configured to sense a position of the arm portion relative to the base portion of the discharge chute (e.g., see position sensor 416 shown in FIGS. 4 and 5). The control of the discharge direction, by the control system, is further based on the sensed position of the arm portion. And, the computing system is configured to determine a control parameter of the second joint based on the sensed position of the arm portion, the determined landing point, and the target landing point.

In embodiments including an IMU, the IMU is configured to sense ground speed and acceleration of the spout. And, the control of the discharge direction, by the control system, is based on the sensed ground speed or acceleration of the spout. Also, the computing system is configured to further determine the control parameter of at least one of the first joint and the second joint based on the sensed ground speed and acceleration of the spout. In such embodiments and others, the computing system is configured to determine a target ground speed of the harvester based on the sensed ground speed or acceleration of the spout and a sensed ground speed or a given ground speed of the receiving vehicle. And, the control system is configured to control acceleration or deacceleration of the harvester according to the determined target ground speed of the harvester.

Figure 2:
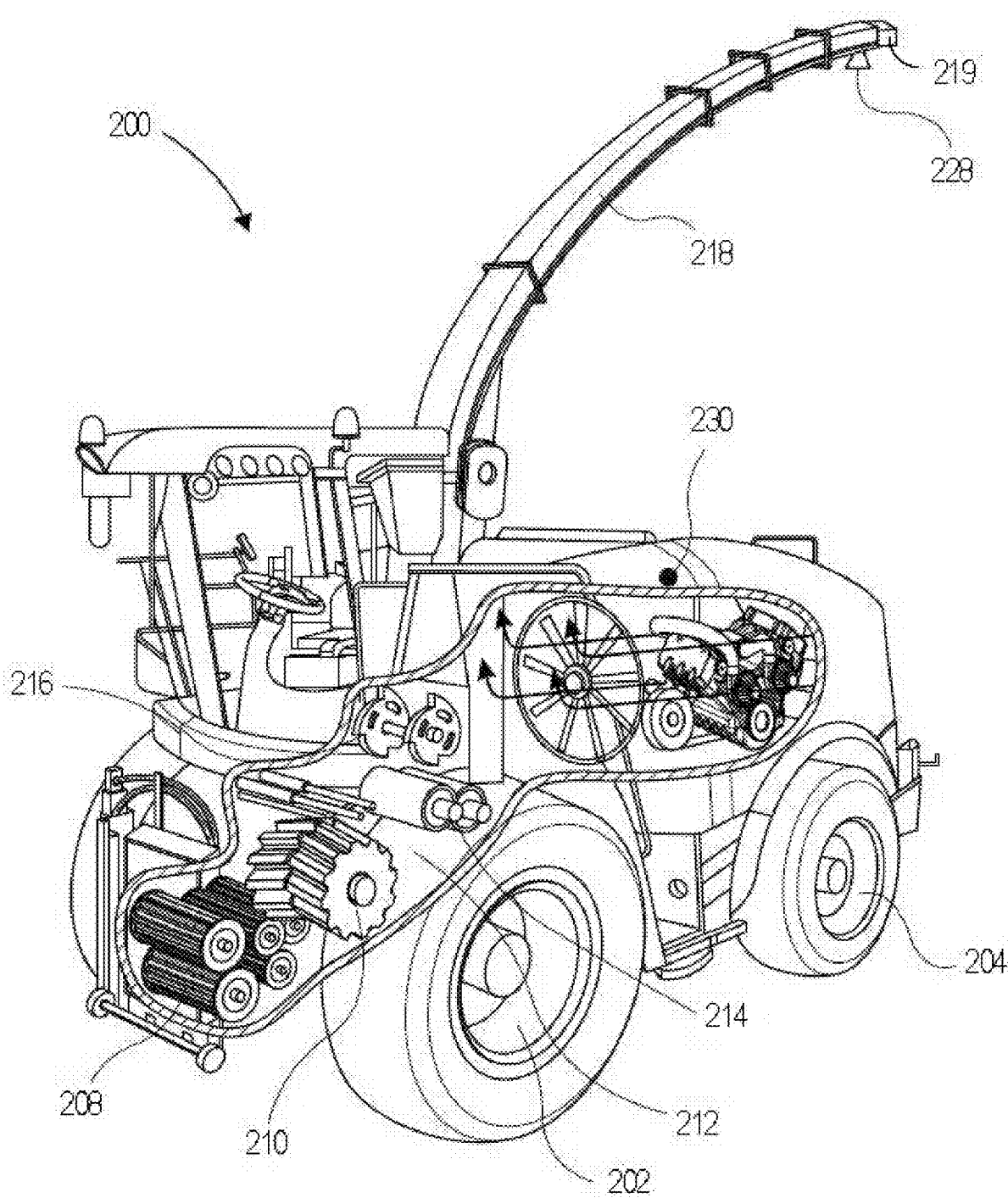
FIG. 2 illustrates a perspective view of a forage harvester, which can be the harvester shown in FIG. 1, with some portions of the forage harvester being broken away to reveal some internal details of construction, in accordance with some embodiments of the present disclosure.
Figure 3:
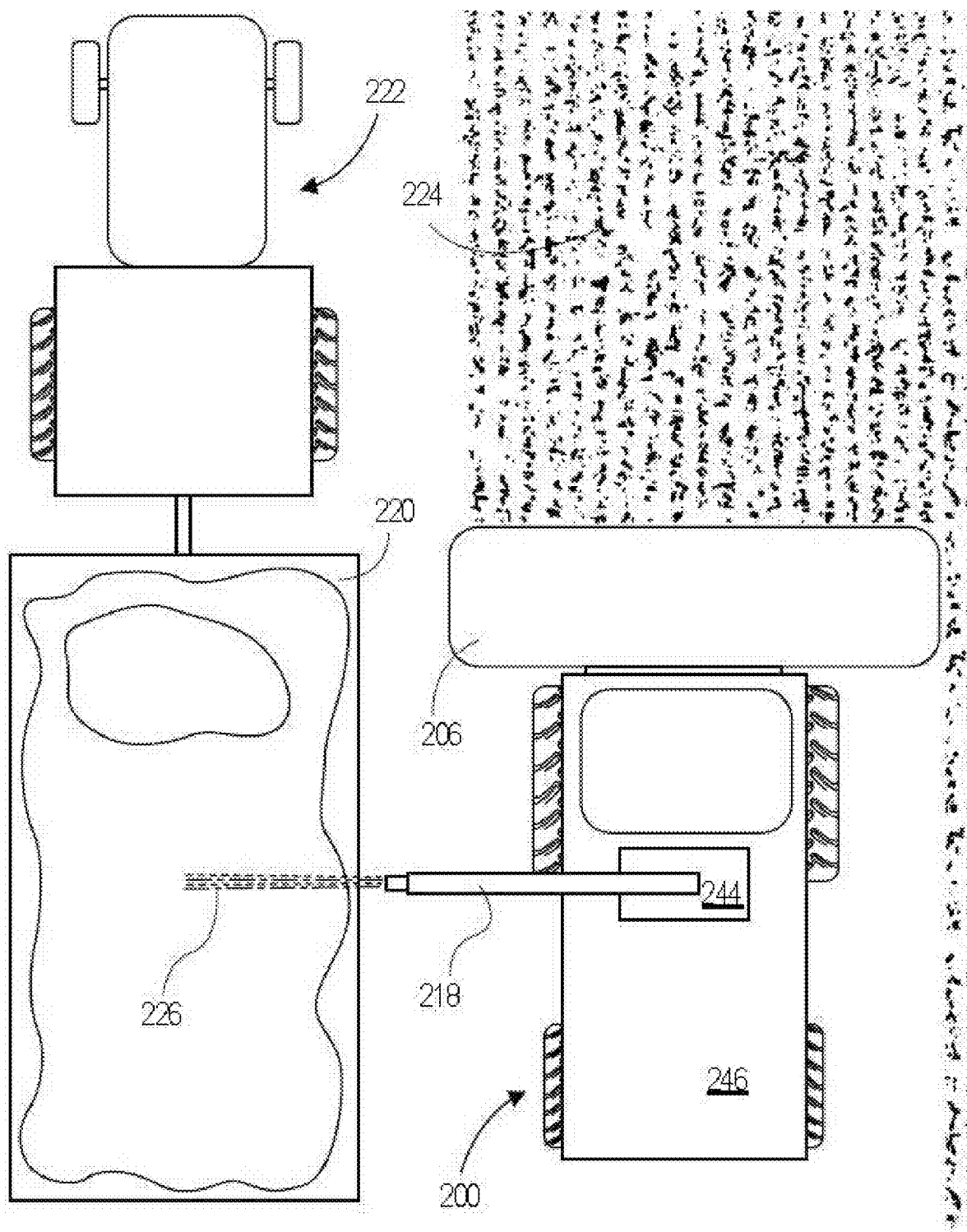
FIG. 3 illustrates the forage harvester of FIG. 2 harvesting crop and transferring a stream of processed crop to a receiving vehicle, in accordance with some embodiments of the present disclosure.

FIG. 2 illustrates a perspective view of a forage harvester 200, which can be the harvester 106 shown in FIG. 1, with some portions of the forage harvester being broken away to reveal some internal details of construction. FIG. 3 illustrates the forage harvester 200 harvesting crop and transferring a stream of processed crop to a receiving vehicle.

As mentioned, the harvester 106 can be a forage harvester, such as self-propelled forage harvester 200 illustrated in FIGS. 2 and 3. The forage harvester 200 is supported by front 202 and rear 204 wheels. The forage harvester 200 connects to a header 206 suitable for harvesting a foraged crop. The header 206 is provided for severing or picking up the crop off the ground and directing it to a series of feed rollers 208 that compact the raw crop material and advance it to one or more chopping drums 210. The chopped crop material follows a drum floor 212 to roller crackers 214 that crack grain kernels. From there the processed crop material is blown by an unload conveyor 216 through a discharge chute 218 into a receiving vehicle, such as a wagon 220 pulled by a tractor 222. As used herein, the feed rollers 208, chopping drums 210 and roller crackers 214 constitute a crop processor that takes raw crop material (plants or portions of plants cut or picked up from the field) and reduce the raw crop material to processed crop material (chopped plant matter). Furthermore, the discharge chute 218 is a type of unload conveyor as used herein and the end of the chute includes a spout 219.

In operation, the forage harvester 200 advances through a field cutting the crop 224 standing in the field and processes the crop as explained herein. The processed crop is transferred from the forage harvester 200 to the wagon 220 by way of the discharge chute 218. A stream of processed crop 226 is blown through the chute 218 into the wagon 220. The tractor 222 and wagon 220 follow the forage harvester 200 through the field.

As shown in FIG. 3, the discharge chute 218 includes base portion 244 attached to a main body portion 246 of the harvester.

Figure 18:
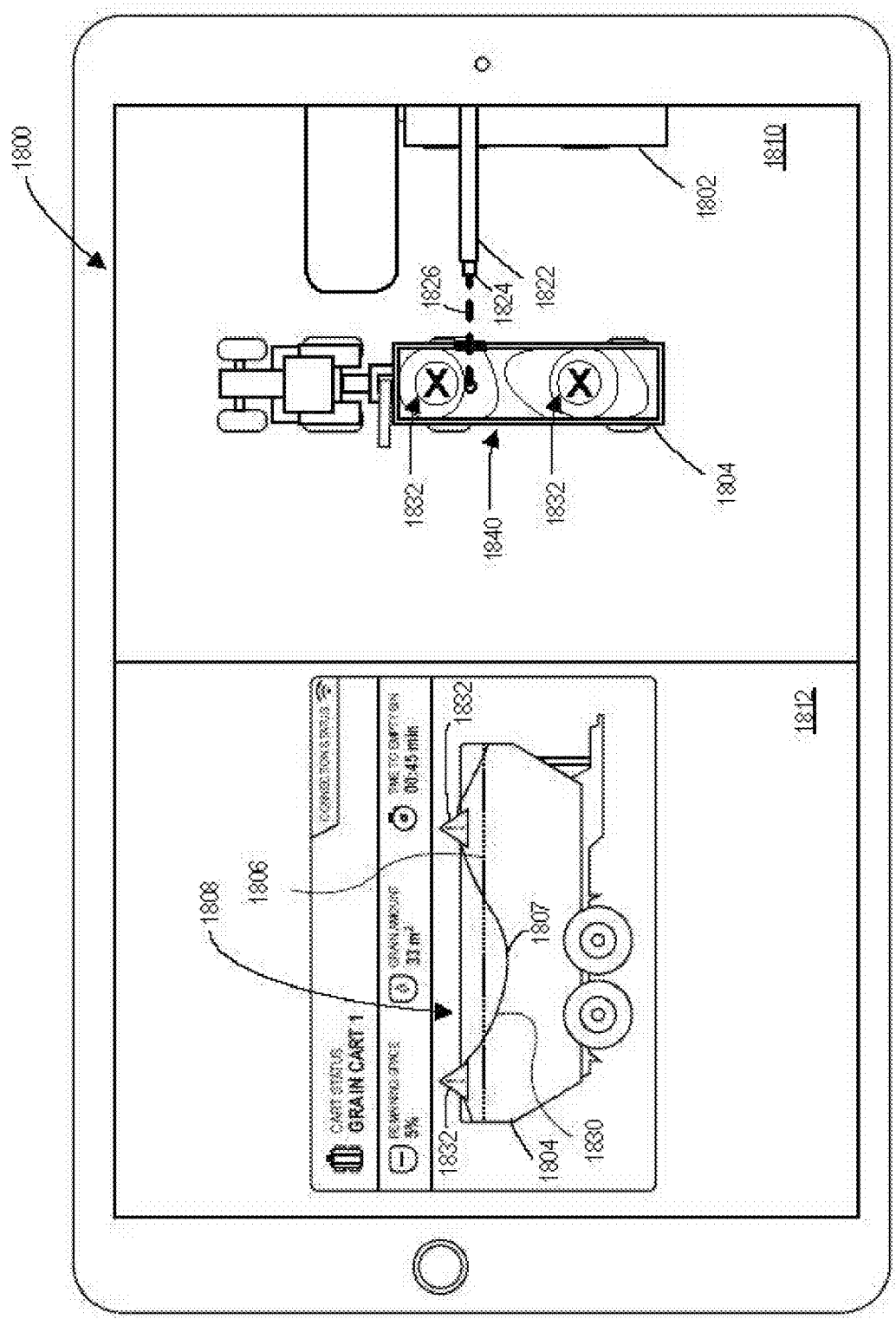
FIGS. 18 and 19 illustrates a graphical user interface (GUI) including a graphical representation of relative positions of an agricultural harvester and a receiving vehicle.
Figure 19:
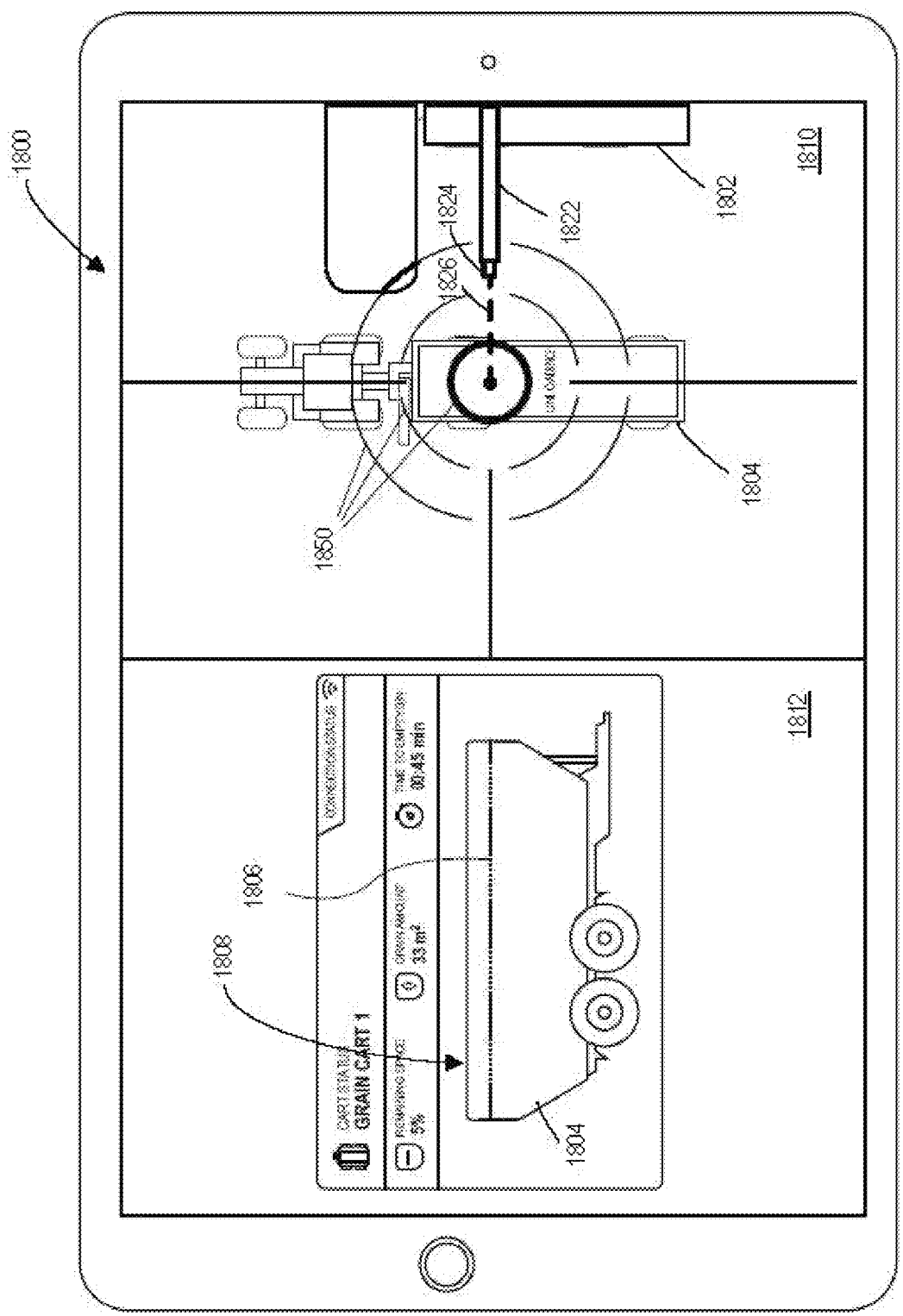

The forage harvester 200 includes an onboard electronic system with similar components to a possible combination of the control system 136 and the computing system 126 which, in some embodiments, includes a controller, position determining device, user interface, sensors, actuators, storage components, input/output ports, a communications gate, a first electromagnetic detecting and ranging module 228 and a second electromagnetic detecting and ranging module 230. The modules 228 and 230 each can include a respect LIDAR system along with corresponding one or more computing devices, to detect and track a location of a receiving vehicle (such as the wagon 220) and at least one of the fill level and content distribution of crop material within the receiving vehicle. The data collected by the modules 228 and 230 is used to generate a graphical representation of the unload conveyor 216 of the harvester 200 and the receiving vehicle that is presented to an operator of either the harvester 200 or the tractor 222 by way of a graphical user interface (GUI), e.g., see GUI 1800 as shown in FIGS. 18 and 19. Also, the data collected by the modules 228 and 230 can be used to generate guidance data used by at least one of the harvester 200 and the receiving vehicle to automatically guide at least one of the vehicles to maintain proper alignment of the unload conveyor 216 with the receiving vehicle. The respective control systems of the vehicles can provide such automation (e.g., see control systems 136 and 138).

As used herein, an "unload operation" includes transferring processed crop from a forage harvester to a silage wagon as illustrated in FIG. 3.

FIGS. 4 and 5 illustrate side views of two different embodiments of the discharge chute 218 of the forage harvester 200 shown in FIGS. 2 and 3. FIG. 4 shows an embodiment of the discharge chute with the LIDAR system 116 positioned underneath the chute, and FIG. 5 shows an embodiment of the chute with the LIDAR system 116 positioned above the chute. In both shown examples IMU 418 is mounted with LIDAR system 116. The chute 218 is shown having spout 219 joined to an arm portion 409 of the chute by a joint 410. The joint 410 is configured to permit the spout to pivot vertically up and down relative to the end of the arm portion 409. The arm portion 409 of the chute 218 is joined to base portion 244 of the chute at joint 414. The joint 414 is configured to permit the arm portion to pivot horizontally relative to a top main body portion of the harvester 200 (e.g., see main body portion 246) as well as relative to the base portion 244. The base portion 244 interfaces the arm portion 409 of the chute 218 to the main body portion 246 of the harvester 200. Position sensors 412 and 416 are attached to the chute 218. The position sensor 412 is configured to sense the position of the spout 219 relative to the arm portion 409. The position sensor 416 is configured to sense the position of the arm portion 409 relative to the harvester 200.

FIGS. 4 and 5 also show a crop material path 401 determined by a computing system (e.g., see any one of the computing systems described herein) that makes the determination by extrapolating points (e.g., see point 411) along an arc formed by a scanned in crop material flow. The position of the arm portion 409 of the chute 218 and the position of the spout 219 controls a discharge direction 404 of the spout, the flow of the material starts in the discharge direction 404 and ends when it reaches an inner surface 402 of bin 420 of a receiving vehicle (e.g., see wagon 220). The computing system can estimate a landing point 403 based on the crop material path 401 and detection of the inner surface 402. The crop material flow (e.g., see stream of processed crop 226) and the inner surface 402 are scanned in by the LIDAR system 116. Also, shown in the FIGS. 4 and 5, the field of view of the LIDAR system 116, limited by boundaries represented by dashed lines 430a and 430b as well as 430c and 430d, respectively, are able to capture the crop material flow and the inner surface 402 of the bin 420 regardless of being position above the chute 218 or below the chute.

Figure 6:
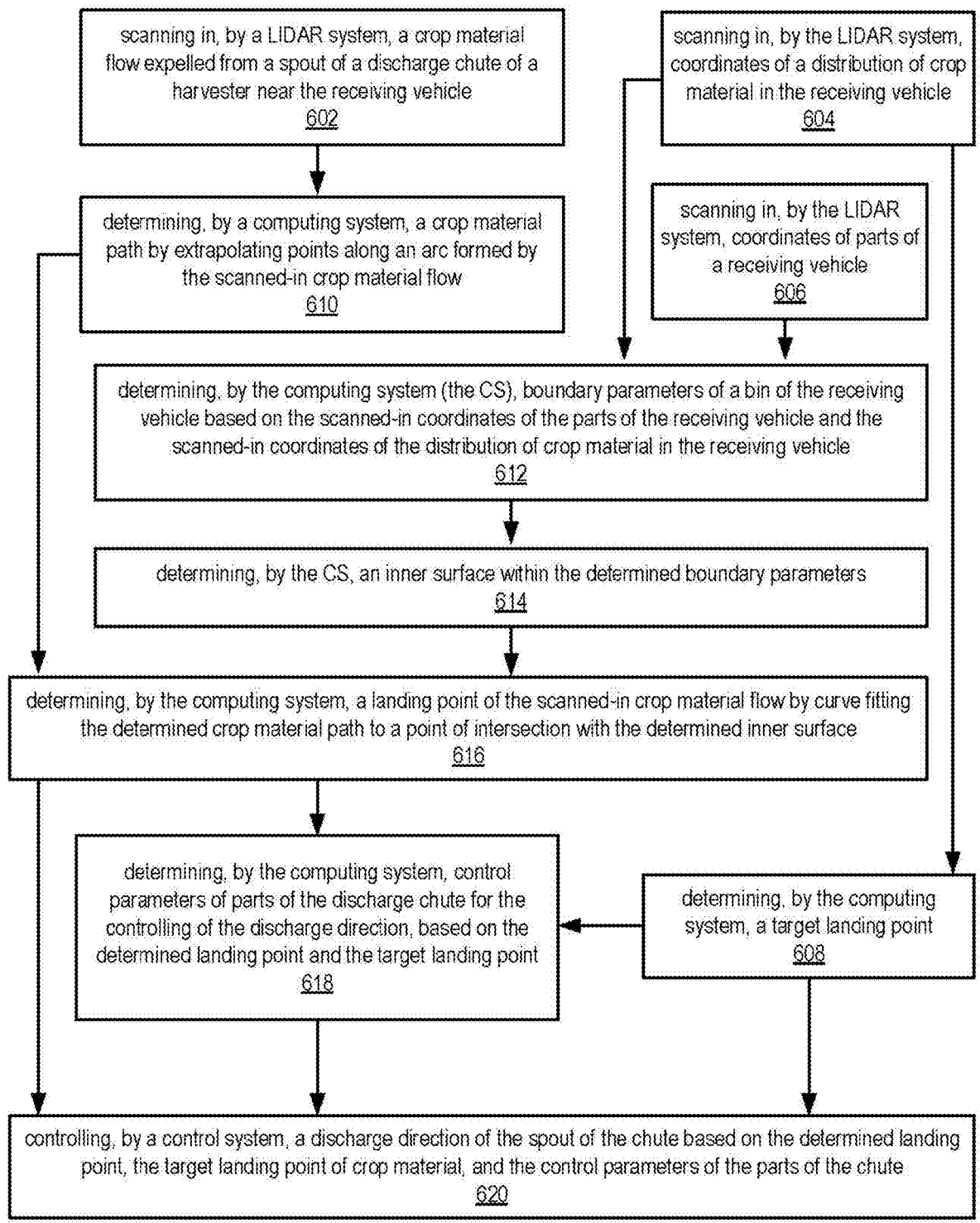
FIGS. 6 and 7 illustrate example methods for light detection and ranging (LIDAR) detection of path and landing position of crop material expelled from a forage harvester and use of such information as feedback for operating the harvester or the receiving vehicle, in accordance with some embodiments of the present disclosure.
Figure 7:
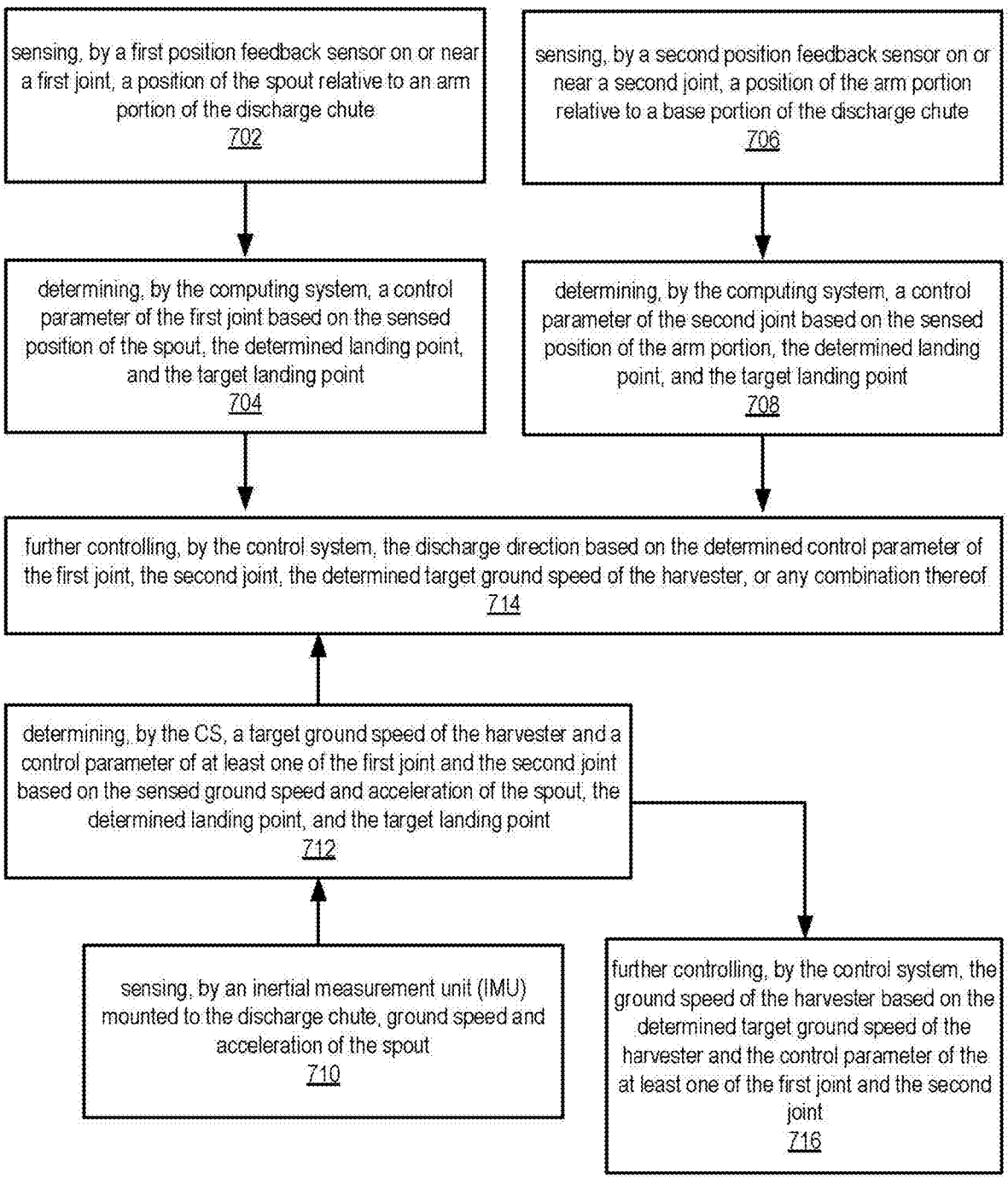

FIGS. 6 and 7 illustrate example methods 600 and 700 for LIDAR detection of path and landing position of crop material expelled from a forage harvester (e.g., see harvester 106 or 200) and use of such information as feedback for operating the harvester or the receiving vehicle (e.g., see receiving vehicle 109 or wagon 220).

Figure 8:
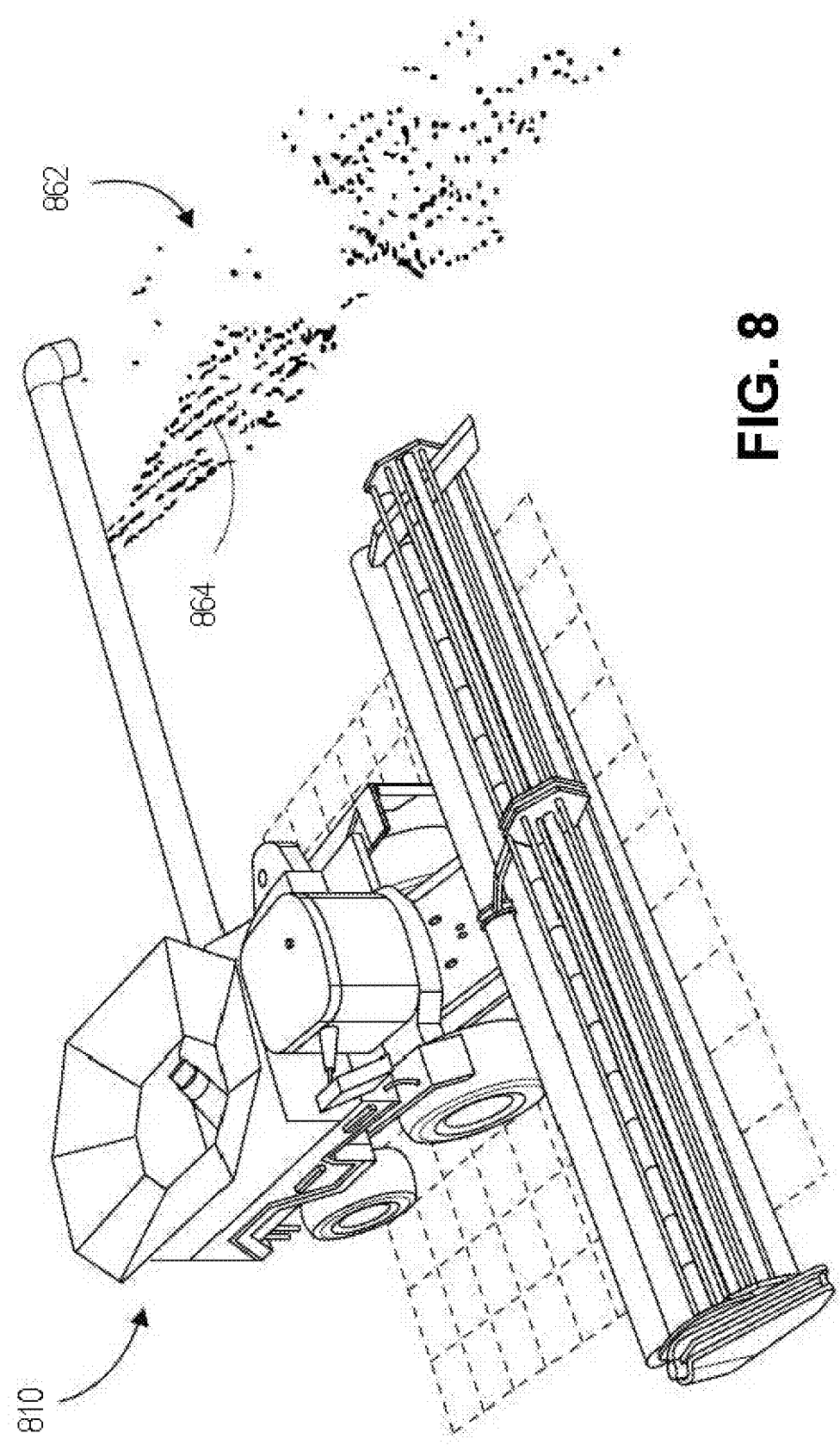
FIG. 8 is a perspective view of an agricultural harvester illustrating data points collected by the LIDAR system shown in FIGS. 1, 4, and 5, wherein the LIDAR system includes a three-dimensional LIDAR scanner, in accordance with some embodiments of the present disclosure.

Method 600 starts with steps 602, 604, and 606. Step 602 includes scanning in, by a LIDAR system (e.g., see LIDAR system 116), a crop material flow (e.g., see stream of processed crop 226) expelled from a spout of a discharge chute of the harvester (e.g., see spout 219) near the receiving vehicle. Step 604 includes scanning in, by the LIDAR system, coordinates of a distribution of crop material in the receiving vehicle (e.g., see scanned in distribution of crop material 902 shown in FIG. 9B, also see point cloud 862 is depicted in FIG. 8). Step 606 includes scanning in, by the LIDAR system, coordinates of parts of the receiving vehicle. In some embodiments, the LIDAR system is mounted above the spout of the discharge chute, and in some other embodiments, the LIDAR system is mounted below the spout of the discharge chute.

Method 600 continues with step 608, which includes determining, by a computing system (also referred to herein as the CS), a target landing point. In some embodiments, the target landing point is based on detected different fill levels that are based on the scanned in coordinates of a distribution of crop material. Method 600 also continues with step 610, which includes determining, by a computing system (e.g., see computing systems 126 and 128 as well as FIG. 25), a crop material path by extrapolating points along an arc formed by the scanned in crop material flow (e.g., see crop material path 401 and point 411 shown in FIGS. 4 and 5). Method 600 also continues with step 612, which includes determining, by the computing system, boundary parameters of a bin of the receiving vehicle (e.g., see bin 420 shown in FIGS. 4 and 5 as well as the scanned in data points associated with bin walls shown in FIGS. 8, 9A and 9B) based on the scanned in coordinates of the parts of the receiving vehicle and the scanned in coordinates of the distribution of crop material in the receiving vehicle, e.g., see scanned in distribution of crop material 902 shown in FIG. 9B or see point cloud 862 is depicted in FIG. 8. Method 600 also continues with step 614, after completing step 612, which includes determining, by the CS, an inner surface within the determined boundary parameters, e.g., see inner surface 402 shown in FIGS. 4 and 5.

Subsequent to steps 610 and 614, method 600 continues with step 616, which includes determining, by the computing system, a landing point of the scanned in crop material flow by curve fitting the determined crop material path to a point of intersection with the determined inner surface, e.g., see landing point 403 shown in FIGS. 4 and 5.

Subsequent to step 616 and 608, method 600 continues with step 618, which includes determining, by the computing system, control parameters of parts of the discharge chute for the controlling of a discharge direction, based on the determined landing point and the target landing point, e.g., see discharge chute 218 and discharge direction 404 shown in FIGS. 4 and 5. And, finally, subsequent to steps 608, 616, and 618, the method 600 continues with step 620, which includes controlling, by a control system (e.g., see control system 136), a discharge direction of a spout of the chute based on the determined landing point, the target landing point of crop material, and the control parameters of the parts of the chute.

In some embodiments, the discharge chute includes a first joint that joins the spout to an arm portion of the discharge chute. In such examples and others, the discharge chute includes a second joint that joins the arm portion to a base portion of the discharge chute, and the base portion of the discharge chute is attached to a main body portion of the harvester. Also, in such examples and others, the discharge chute includes an inertial measurement unit (IMU) mounted to the discharge chute. In such embodiments and others, the operations of method 600 can be further enhanced by the additional operations of method 700.

Method 700 starts with steps 702, 706, and 710. Step 702 includes sensing, by a first position feedback sensor on or near the first joint, a position of the spout relative to the arm portion of the discharge chute, e.g., see joint 410 and position sensor 412 shown in FIGS. 4 and 5. Step 706 includes sensing, by a second position feedback sensor on or near a second joint, a position of the arm portion relative to a base portion of the discharge chute, e.g., see joint 414 and position sensor 416. Step 7010 includes sensing, by the IMU, ground speed and acceleration of the spout, e.g., see IMU 418.

Method 700 continues with steps 704, 708, and 712. Step 704 includes determining, by the computing system, a control parameter of the first joint based on the sensed position of the spout, the determined landing point, and the target landing point. Step 708 includes determining, by the computing system, a control parameter of the second joint based on the sensed position of the arm portion, the determined landing point, and the target landing point. Step 712 includes determining, by the CS, a target ground speed of the harvester and a control parameter of at least one of the first joint and the second joint based on the sensed ground speed and acceleration of the spout, the determined landing point, and the target landing point.

Finally, method 700 continues with steps 714 and 716. Step 714 includes further controlling, by the control system, the discharge direction based on the determined control parameter of the first joint, the second joint, the determined target ground speed of the harvester, or any combination thereof. Step 716 includes further controlling, by the control system, the ground speed of the harvester based on the determined target ground speed of the harvester and the control parameter of the at least one of the first joint and the second joint.

FIG. 8 is a perspective view of an agricultural harvester 810 illustrating data points collected by the LIDAR system 116 shown in FIGS. 1, 4, and 5, wherein the LIDAR system includes a three-dimensional LIDAR scanner. The harvester 810 can be the harvester 106 or be replaced by the harvester 200.

An electromagnetic detecting and ranging module (e.g., see the first electromagnetic detecting and ranging module 228 or the LIDAR system 116) is position at an end of a chute of the harvester 810 (e.g., see chute 218) near or at the spout of the chute (e.g., see spout 219). In some embodiments, the electromagnetic detecting and ranging module includes a three-dimensional LIDAR scanner positioned to scan an area extending outwardly from a side surface of the harvester 810 and with a center of the scan area being perpendicular or approximately perpendicular to the longitudinal axis of the harvester 810. This corresponds to an area in which a receiving vehicle is located during crop transfer operations. The module generates a plurality of data points constituting a point cloud representative of points on surfaces within a scan area, including points on surfaces of the receiving vehicle, the ground and other objects within the scan area. A portion of a point cloud 862 is depicted in FIG. 8 illustrating some of the data points corresponding to the receiving vehicle and a tractor pulling the receiving vehicle. One or more computing devices receive the data generated by the module and use the data to detect the presence of the receiving vehicle and to determine the location of the receiving vehicle relative to the harvester 810. To detect the presence of the receiving vehicle, the one or more computing devices process the data received from the module to determine whether one or more features or characteristics of the receiving vehicle are present in the data. The point cloud 862 depicted in FIG. 8, for example, illustrates various features of the receiving vehicle that can be reflected in the data collected by the module. A pattern 864 in the point cloud 862 corresponding to an exterior side surface of the receiving vehicle is visible including a front edge, a top edge, a rear edge and a bottom edge of the surface shown in the pattern 864. The one or more computing devices process the data to identify the presence of a surface that approximately matches the anticipated shape, size, angle and/or location of a surface of the receiving vehicle. It does this by looking for a pattern in the point cloud corresponding to a flat surface. Once it detects a flat surface it processes the data to identify additional features or patterns that correspond to a receiving vehicle, such as a total length of the surface, a total height of the surface, a particular length-to-height ratio of the surface or another pattern indicating another feature or characteristic of the receiving vehicle such as a circular pattern indicating a wheel. The one or more computing devices can use preexisting data sets corresponding to the particular receiving vehicle to identify patterns from the data acquired by the electromagnetic detecting and ranging modules. The one or more computing devices use the data from the module to determine the orientation and the dimensions of the receiving vehicle. Using data from the point cloud 862, for example, the one or more computing devices determine whether the surface corresponding to the size of the receiving vehicle is parallel with the harvester 810 (that is, a front portion of the grain cart is approximately the same distance from the module as a rear portion), or whether a front portion of the receiving vehicle is further from or closer to the module than a rear portion of the receiving vehicle. The one or more computing devices can use the orientation of the receiving vehicle to determine, for example, if the receiving vehicle is following parallel with the harvester 810 or is separating from the harvester 810. The one or more computing devices determine the dimensions (or approximate dimensions) of the receiving vehicle by identifying a front edge, rear edge and top edge of the point cloud 862. The one or more computing devices can use the dimensions of the receiving vehicle in determining where the spout of the unload conveyor is located relative to the edges of the bin of the receiving vehicle to accurately generate a graphical depiction of the relative positions of the unload conveyor and the bin and present the graphical depiction on a graphical user interface. In some embodiments, the one or more computing devices use the dimensions of the receiving vehicle to determine where the spout of the unload conveyor or chute is located relative to the edges of the bin of the receiving vehicle in automatically controlling crop transfer to only transfer crop from the harvester 810 to the receiving vehicle while the spout is over the bin.

Once the one or more computing devices have identified the patterns and features in the point cloud sufficiently to determine that the object is the receiving vehicle, the one or more computing devices use data from the module to determine and track the location of the receiving vehicle relative to the harvester 810. Tracking the location of the receiving vehicle relative to the harvester 810 can involve determining two variables—the lateral distance of the receiving vehicle from the harvester 810 and the longitudinal offset of the receiving vehicle relative to the harvester 810.

Each of the data points making up the point cloud 862 includes a distance value indicating a distance from the module, therefore determining the lateral distance of the receiving vehicle from the harvester 810 involves using the distance values of the relevant points in the point cloud 862, such as the points defining the pattern 864 corresponding to the exterior surface of the receiving vehicle. If the average distance of to the data points corresponding to the surface is six meters, for example, the lateral distance of the receiving vehicle from the harvester 810 is six meters.

To determine the longitudinal offset of the grain cart from the harvester 810 the one or more computing devices determine the location of one or more features of the receiving vehicle within the field of view of the module and, in particular, whether the feature(s) is to the left or to the right of a center of the scan area of the module. If the center of the exterior surface of the receiving vehicle is determined to be at the center of the field of view of the module, for example, the receiving vehicle is determined to have a longitudinal offset of zero. If the center of the exterior surface of the receiving vehicle is determined to be ten degrees to the left of the center of the field of view, the receiving vehicle has a negative longitudinal offset corresponding to a distance that is determined using the lateral distance and the angle of ten degrees. If the center of the exterior surface of the receiving vehicle is determined to be ten degrees to the right of the center of the field of view, the receiving vehicle has a positive longitudinal offset corresponding to a distance that is determined using the lateral distance and the angle of ten degrees.

Figure 9A:
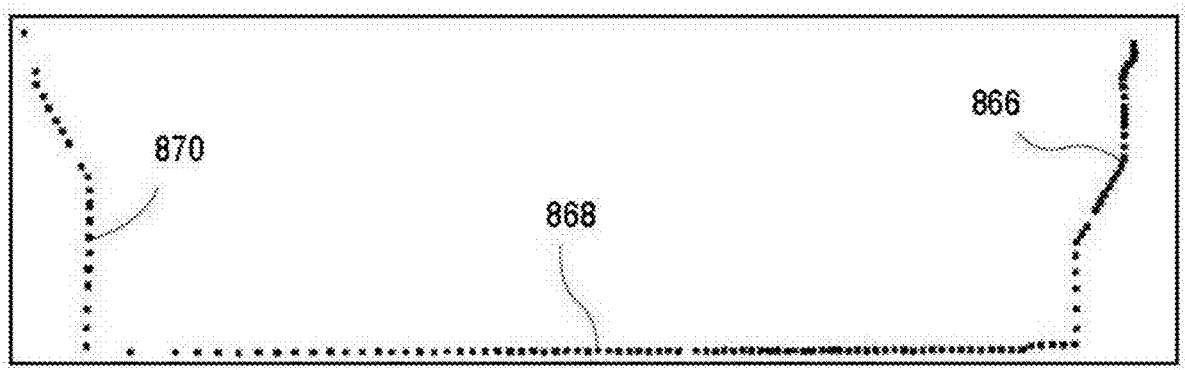
FIG. 9A illustrates data points collected by the LIDAR system shown in FIGS. 1, 4, and 5 when placed near an empty bin of a receiving vehicle, wherein the LIDAR system includes a two-dimensional LIDAR scanner, in accordance with some embodiments of the present disclosure.
Figure 9B:
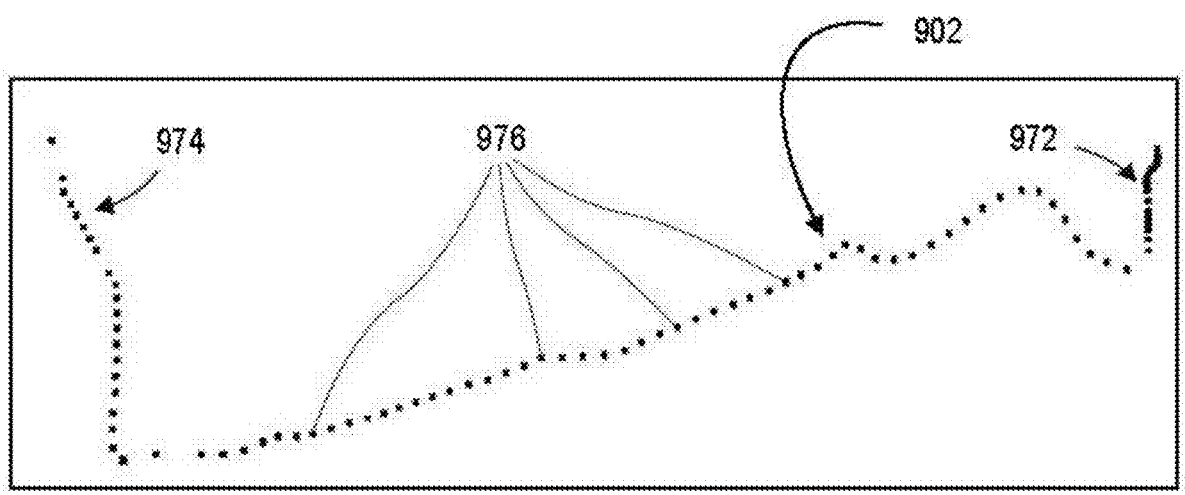
FIG. 9B illustrates data points collected by the LIDAR system shown in FIGS. 1, 4, and 5 when placed near a partially filled bin of a receiving vehicle, wherein the LIDAR system includes a two-dimensional LIDAR scanner, in accordance with some embodiments of the present disclosure.

FIG. 9A illustrates data points collected by the LIDAR system 116 shown in FIGS. 1, 4, and 5 when placed near an empty bin of a receiving vehicle, wherein the LIDAR system includes a two-dimensional LIDAR scanner. FIG. 9B illustrates data points collected by the LIDAR system 116 shown in FIGS. 1, 4, and 5 when placed near a partially filled bin of a receiving vehicle, wherein the LIDAR system includes a two-dimensional LIDAR scanner. In embodiments related to FIGS. 9A and 9B, a two-dimensional LIDAR scanner of the LIDAR system 116 is configured to generate a plurality of data points within a plane corresponding to a scanned area. Each data point of the plurality of data points includes a distance value corresponding to a distance from the LIDAR system 116 or a scanner of the LIDAR system. As with the data from the LIDAR system 116, one or more computing devices process the data from the LIDAR system to identify patterns. A series of data points generated by the LIDAR system when the bin of the receiving vehicle is empty is illustrated in FIG. 9A. A first pattern 866 of the data points corresponds to an interior surface of a front wall of a bin, a second pattern 868 corresponds to an interior surface of a floor of the bin and a third pattern 870 corresponds to an interior surface of a rear wall of the bin. A series of data points generated by the LIDAR system 116 when the bin is partially filled is illustrated in FIG. 9B. In FIG. 9B the generally vertical patterns near the front data pattern 972 and the near the rear data pattern 974 of the data set correspond to the front and rear walls of the bin while the data points 976 corresponding to the generally diagonal angled and curved patterns between the front and rear walls correspond to a top surface of a quantity of crop heaped in the bin. The top surface scanned in by the LIDAR system 116 represents a scanned in distribution of crop material 902

The one or more computing devices use the data generated by the LIDAR system 116 to determine one or more fill levels or topography of a bin of a receiving vehicle. To determine a fill level of a bin, the one or more computing devices identify data points 976 corresponding to crop (verses data points corresponding to walls or the floor of the bin), determine a fill height of each of the data points corresponding to crop, and then average the fill height of the data points corresponding to crop to generate an average fill level of the bin.

To identify data points corresponding to crop the one or more computing devices can use patterns in the data, receiving vehicle location information generated using data from the LIDAR system 116, or both. The one or more computing devices can use patterns in the data by identifying patterns corresponding to certain parts of the bin such as a front wall (e.g., see front data pattern 972), rear wall (e.g., see rear data pattern 974) and floor (e.g., see pattern 868) or a combination of two or more of these features. In the collection of data illustrated in FIG. 7, for example, the walls and floor are identified from the data patterns 866, 868, 870 and it is determined that none of the data points correspond to crop. In the collection of data illustrated in FIG. 9A, the front wall and the rear wall are identified from the data patterns 972 and 974. When the data patterns detected in FIG. 9A are compared to a data pattern corresponding to an empty bin (FIG. 9A) it is determined that most of the data points between the front wall and the rear wall do not match the expected location and shape of a data pattern corresponding to the floor and, therefore, correspond to crop. The one or more computing devices then determine a fill height of each of the data points corresponding to crop, wherein the fill height is the distance of the data point from the floor of the bin to the data point. The fill height can be determined by comparing the location of the data point to the anticipated location of the floor. In the illustrated data patterns, this can involve comparing the data points 976 to second pattern 868. Once the fill height is determined for all of the data points an average fill height of all of the data points is determined and used as the overall bin fill level, as stated herein.

The one or more computing devices can also use receiving vehicle location information from LIDAR system 116 to determine or assist in determining the fill level of the bin of the receiving vehicle. If the location of the receiving vehicle relative to the harvester (e.g., see harvester 106 or 200) is known the vehicle's location relative to the unload conveyor can be used to determine the height of the data points corresponding to crop relative to the floor of the bin by comparing the location of the data point to the location of the floor of the bin determined using the location of the receiving vehicle.

Also, the one or more computing devices determine a distribution of crop in the bin. Using the data pattern illustrated in FIG. 8 or FIG. 9B, for example, the fill height of each data point is determined as explained herein and a fill height value and longitudinal (distance from the rear wall or from the front wall) is stored for each data point. That information can then be used by the one or more computing devices to depict a fill level at various locations in the bin in a GUI, as discussed herein.

While the description herein describes a technique of determining the fill level and distribution of crop material in the receiving vehicle by comparing differences between a measured surface of the crop with an anticipated floor of the receiving vehicle, it will be appreciated that other techniques can be used to determine the fill level and the distribution. The one or more computers can compare the measured surface of crop material with a top of the receiving vehicle, for example. The top of the receiving vehicle can be determined using data generated by the LIDAR system 116, using the data patterns 972 and 974 generated by the LIDAR system, using data provided by an operator or manufacturer of the bin of the receiving vehicle, or a combination thereof. Alternatively, the patterns from point cloud 862, depicted in FIG. 8, can be used too.

The one or more computing devices can detect patterns in the data generated by the LIDAR system 116 by comparing data generated by the LIDAR system with preexisting data corresponding to the receiving vehicle. The preexisting data is collected by the LIDAR system 116 (or similar system) or is generated by another sensor or a computer to simulate such data and provides the one or more computing devices known data patterns corresponding to the receiving vehicle. During operation the one or more computing devices compare the data generated by the LIDAR system 116 with the preexisting data to identify such patterns as the exterior side surface of the receiving vehicle, edges of the receiving vehicle, the interior surfaces of the front wall, floor and rear wall of the bin, or features of the tractor such as the rear and front wheels. Preexisting data can be similar to the data set depicted in FIG. 9A or FIG. 8, for example, and data generated by the LIDAR system 116 during an operation can be similar to the data set depicted in FIG. 9B or FIG. 8.

Figure 10:
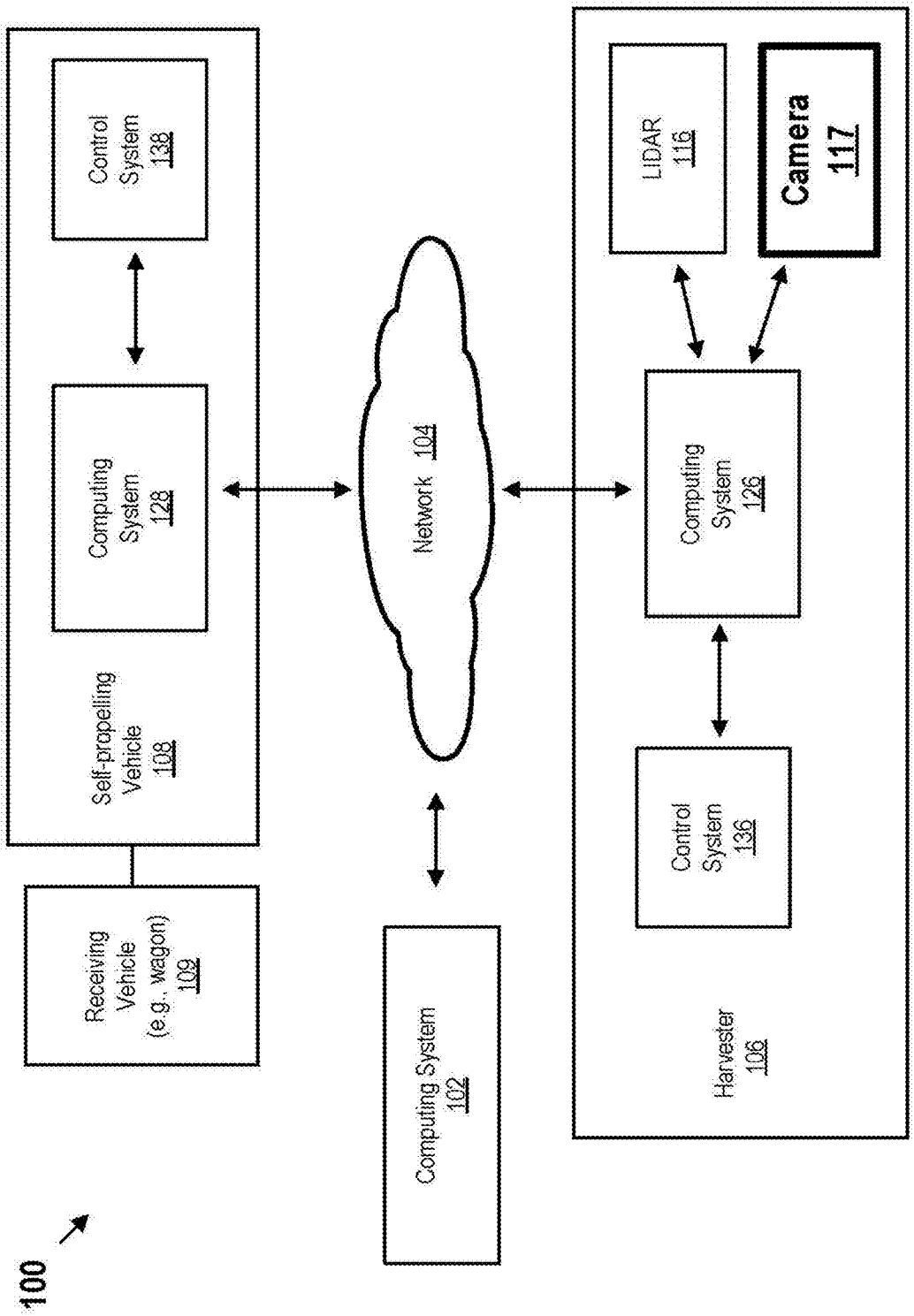
FIG. 10 illustrates the network shown in FIG. 1, wherein the harvester includes a camera and wherein the data captured by the camera verifies data captured by the LIDAR and further enhances detecting crop material path and landing position of the harvester output and using such information for feedback control, in accordance with some embodiments of the present disclosure.

FIG. 10 illustrates network 100, wherein the harvester 106 includes a camera 117 and wherein the data captured by the camera verifies data captured by the LIDAR system 116 and further enhances detecting crop material path and landing position of a harvester output and using such information for feedback control.

With respect to FIG. 10, some embodiments include an apparatus that includes a camera 117, a LIDAR system 116, and a computing system (e.g., see computing system 102, 126, or 128). In such embodiments, the camera 117 is configured to capture image data of a receiving vehicle (e.g., see receiving vehicle 109) and a self-propelled vehicle moving the receiving vehicle (e.g., see self-propelled vehicle 108). The LIDAR system 116 is configured to: scan in coordinates of parts of the receiving vehicle and the self-propelled vehicle, scan in coordinates of a distribution of crop material in the receiving vehicle, and scan in a crop material flow expelled from a spout of a discharge chute of a harvester near the receiving vehicle, e.g., see stream of processed crop 226.

In such embodiments, the computing system is configured to determine a crop material path by extrapolating points along an arc formed by the scanned in crop material flow. The computing system is also configured to determine boundary parameters of a bin of the receiving vehicle based on the scanned in coordinates of the parts of the receiving vehicle and the self-propelled vehicle and the scanned in coordinates of the distribution of crop material in the receiving vehicle. Also, the computing system is also configured to process the captured image data to detect the receiving vehicle and the self-propelled vehicle moving the receiving vehicle and detect a location of the receiving vehicle relative to the harvester. Subsequently, the computing system is configured to compare the determined boundary parameters to the processed image data to validate and augment the determined boundary parameters as well as to determine an inner surface within the validated and augmented boundary parameters. Also, the computing system is configured to determine a landing point of the expelled crop material flow by curve fitting the determined crop material path to a point of intersection with the determined inner surface. And, finally, the computing system is configured to process information determined by the computing system to generate a graphical representation of the processed information or to provide feedback to a control system of the harvester or the self-propelled vehicle moving the receiving vehicle. In some instances, the determined landing point is an estimated impact point between the expelled material and the determined inner surface, and the determined inner surface includes crop material or a wall of the bin of the receiving vehicle.

In some embodiments of the apparatus shown in FIG. 10, the computing system is configured to: detect an image of the receiving vehicle from the image data, generate a bounding box that surrounds the detected imaged of the receiving vehicle, and detect boundaries of the receiving vehicle using edge detection, within the generated bounding box. In such embodiments, the computing system is also configured to compare the determined boundary parameters, which were based on the scanned in coordinates, to the detected boundaries within the generated bounding box to validate or augment the determined boundary parameters.

In some embodiments of the apparatus shown in FIG. 10, the apparatus also includes the control system. The control system in such embodiments is configured to control a discharge direction of the spout of the discharge chute based on the processed information determined by the computing system. The discharge direction is a direction in which the spout expels the crop material. The control of the discharge direction is at least partially based on the processed image data, the determined landing point, and a target landing point of the crop material. The control system is further configured to determine, via the computing system, control parameters of parts of the discharge chute to control the discharge direction based on the processed image data, the determined landing point, and the target landing point.

In some embodiments of the apparatus shown in FIG. 10, in the processing of the captured image data, the computing system is configured to detect a topography of crop material within the receiving vehicle. The processed image data includes the detected topography, and the target landing point is based on the detected topography. Also, in some embodiments, in the processing of the captured image data, the computing system is configured to detect different fill levels of crop material at different regions within the receiving vehicle. The processed image data includes the detected different fill levels, and the target landing point is based on the detected different fill levels.

In some embodiments of the apparatus shown in FIG. 10, the discharge chute includes a joint, configured to join the spout to an arm portion of the discharge chute, and includes a position feedback sensor on or near the joint, configured to sense a position of the spout relative to the arm portion of the discharge chute. The control of the discharge direction, by the control system, is further based on the sensed position of the spout. Also, in such embodiments, the computing system is configured to determine a control parameter of the joint based on the sensed position of the spout, the determined landing point, and the target landing point.

In some embodiments of the apparatus shown in FIG. 10, the joint is a first joint, the position feedback sensor is a first position feedback sensor, and the discharge chute further includes a second joint and a second position feedback sensor. The second joint is configured to join the arm portion to a base portion of the discharge chute. The base portion of the discharge chute is attached to a main body portion of the harvester. The second position feedback sensor is on or near the second joint and is configured to sense a position of the arm portion relative to the base portion of the discharge chute. The control of the discharge direction, by the control system, is further based on the sensed position of the arm portion. And, the computing system is configured to determine a control parameter of the second joint based on the sensed position of the arm portion, the determined landing point, and the target landing point.

In some embodiments of the apparatus shown in FIG. 10, in the processing of the captured image data, the computing system is configured to detect different fill levels of crop material at different regions within the receiving vehicle, and the processed image data includes the detected different fill levels. Also, the generated graphical representation of the processed information includes the detected different fill levels. In some examples, in the processing of the captured image data, the computing system is configured to detect a topography of crop material within the receiving vehicle, and the processed image data includes the detected topography. Also, the generated graphical representation of the processed information includes the detected topography. In some instances, the generated graphical representation of the processed information includes the detected topography within a graphical representation of the bin of the receiving vehicle as well as a graphical representation of an overhead view of the receiving vehicle, the self-propelled vehicle moving the receiving vehicle, and the harvester.

As shown in FIG. 10, in some embodiments the apparatus is part of the harvester and the apparatus includes the discharge chute. Also, the LIDAR system and the camera are mounted to the discharge chute, and the discharge chute is configured to pivot on the harvester horizontally. In some of such embodiments, the LIDAR system is mounted above the spout of the discharge chute and the camera is mounted below the spout. In some other embodiments, the LIDAR system is mounted below the spout of the discharge chute and the camera is mounted above the spout.

Also, with respect to FIG. 10, some embodiments of an apparatus include a camera, configured to capture image data of a receiving vehicle and a self-propelling vehicle moving the receiving vehicle that is near a harvester, as well as a LIDAR system, configured to: scan in coordinates of parts of the receiving vehicle and the self-propelled vehicle, and scan in coordinates of a distribution of crop material in the receiving vehicle. In such embodiments, the apparatus also includes a computing system, configured to detect an image of the receiving vehicle from the image data and generate a bounding box that surrounds the detected imaged of the receiving vehicle. The bounding box is either a rectangular cuboid or a rectangle. The computing system is also configured to detect boundaries of the receiving vehicle using edge detection, within the generated bounding box. Also, the computing system is configured to estimate fill level based on the detected boundaries and the scanned in coordinates of the distribution of crop material in the receiving vehicle.

Additionally, in such embodiments, the computing system is configured to time-match the captured image data and the scanned in coordinates of the distribution of crop material in the receiving vehicle and the scanned in coordinates of the parts of the receiving vehicle and the self-propelled vehicle to provide time-matched data. Also, the computing system is configured to extract a receiving vehicle portion of the scanned in coordinates of the parts of the receiving vehicle and the self-propelled vehicle based on the time-matched data and the detected image of the receiving vehicle. The computing system is then further configured to estimate dimensions and orientation of the receiving vehicle based on the extracted receiving vehicle portion. Finally, the computing system is configured to generate graphical representations of the estimated fill level and the estimated dimensions and orientation of the receiving vehicle to be displayed on a screen simultaneously.

In some embodiments of the apparatus shown in FIG. 10, the LIDAR system is configured to scan in a crop material flow expelled from a spout of a discharge chute of the harvester. And, the computing system is configured to determine a crop material path by extrapolating points along an arc formed by the scanned in crop material flow as well as determine a landing point of the expelled crop material flow by curve fitting the determined crop material path to a point of intersection with a surface of the receiving vehicle, based on the estimated dimensions and orientation of the receiving vehicle. Also, the computing system is configured to generate a graphical representation of the determined crop material path and the determined landing point along with the estimated fill level and the estimated dimensions and orientation of the receiving vehicle to be displayed on the screen simultaneously.

In some embodiments of the apparatus shown in FIG. 10, the computing system is configured to detect an image of the spout from the captured image data and generate a second bounding box that surrounds the detected imaged of the spout. The computing system is also configured to detect boundaries of the spout using edge detection, within the generated second bounding box and extract a spout portion of detected coordinates in the detected crop material flow, based on the time-matched data and the detected image of the spout. Also, the computing system is configured to estimate dimensions and orientation of the spout based on the extracted spout portion of the detected coordinates in the detected crop material flow. Finally, in such an instance, the computing system is configured to generate a graphical representation of the estimated dimensions and orientation of the spout along with the estimated fill level and the estimated dimensions and orientations of the receiving vehicle to be displayed on the screen simultaneously.

In some embodiments of the apparatus shown in FIG. 10, the computing system is configured to convert the scanned in coordinates of the receiving vehicle and the self-propelled vehicle into a point cloud and estimate the fill level based on the detected boundaries and the point cloud. Further, the computing system is configured to time-match the captured image data and the point cloud to provide the time-matched data and then extract a receiving vehicle portion of the point cloud based on the time-matched data and the detected image of the receiving vehicle. Finally, the computing system is configured to estimate the dimensions and orientation of the receiving vehicle based on the point cloud.

In some embodiments of the apparatus shown in FIG. 10, the computing system is configured to detect an image of the self-propelled vehicle moving the receiving vehicle from the captured image data and generate a second bounding box that surrounds the detected imaged of the self-propelled vehicle. In such an example, the computing system is also configured to detect boundaries of the self-propelled vehicle using edge detection, within the generated second bounding box. It is also configured to extract a moving vehicle portion of the scanned in coordinates associated with the self-propelled vehicle moving the receiving vehicle, based on the time-matched data and the detected image of the self-propelled vehicle and then estimate dimensions and orientation of the self-propelled vehicle based on the extracted moving vehicle portion of the scanned in coordinates. Finally, in such examples, it is configured to generate a graphical representation of the estimated dimensions and orientation of the self-propelled vehicle along with the estimated fill level and the estimated dimensions and orientation of the receiving vehicle to be displayed on the screen simultaneously.

Figure 11:
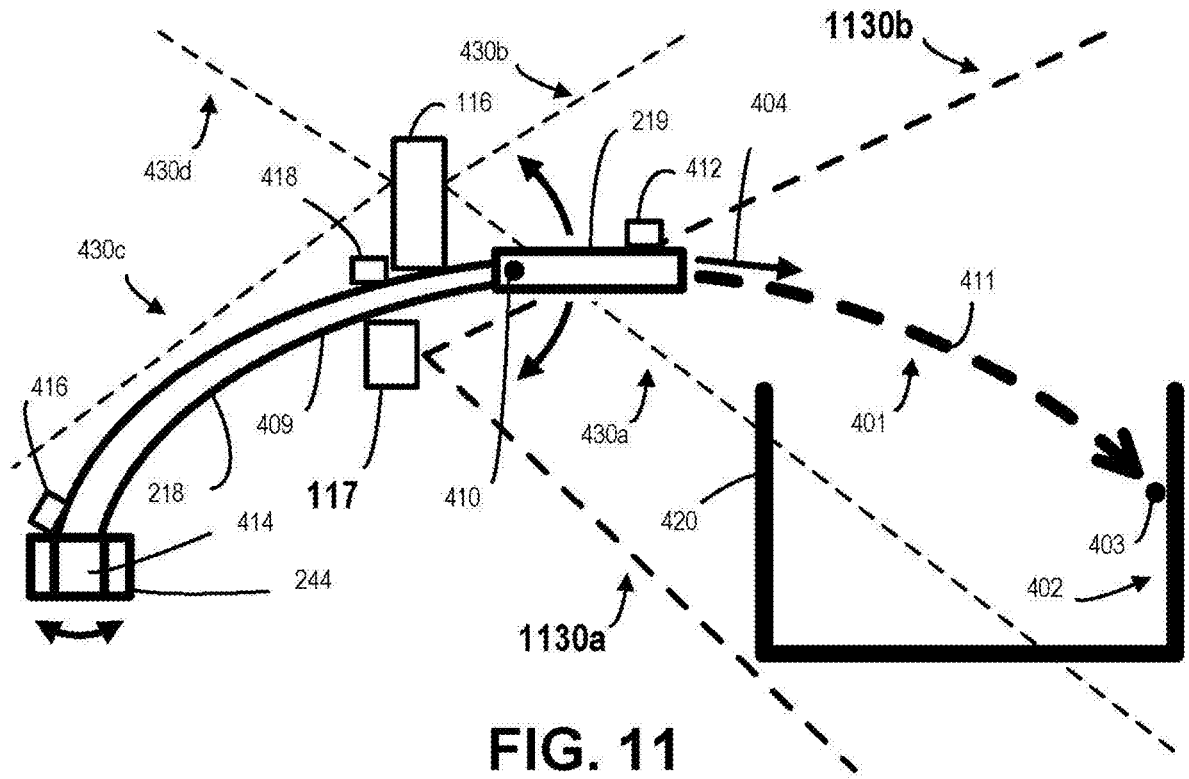
FIGS. 11 and 12 illustrate side views of two different embodiments of the discharge chute similar to the embodiments in FIGS. 4 and 5, respectively, but further including a camera, in accordance with some embodiments of the present disclosure.
Figure 12:
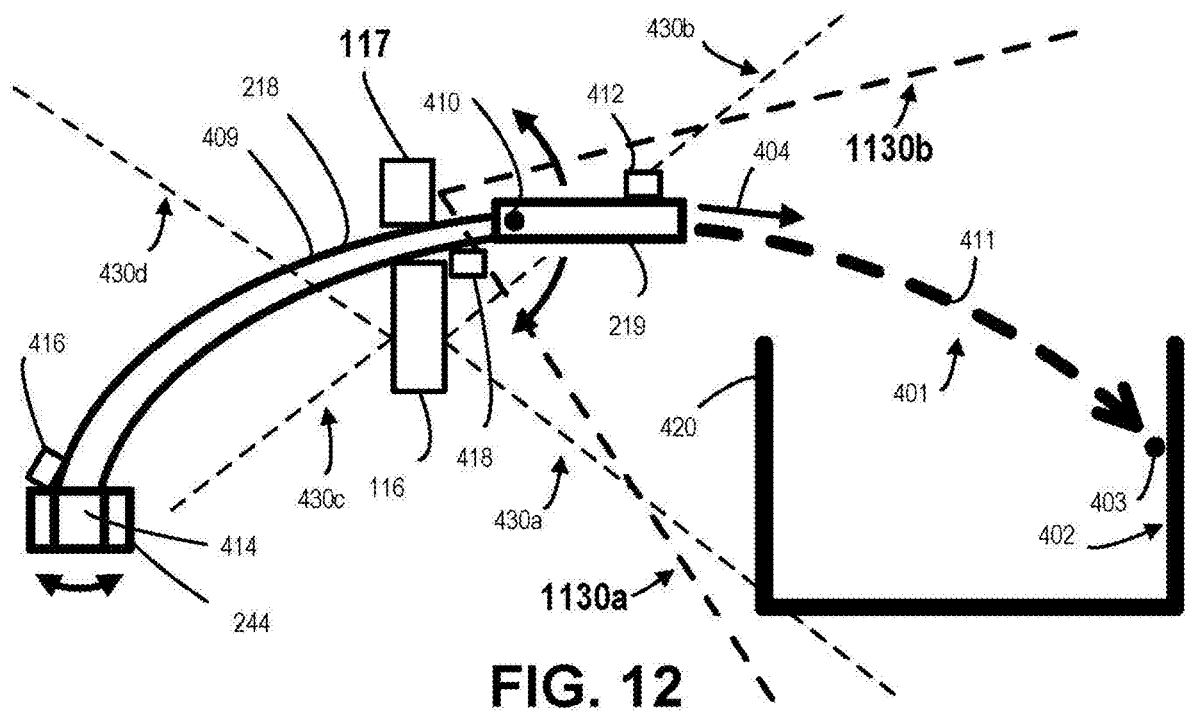

FIGS. 11 and 12 illustrate side views of two different embodiments of the discharge chute similar to the embodiments in FIGS. 4 and 5, respectively, but further including camera 117. Also shown in FIG. 10 and further emphasized by FIGS. 11 and 12, the LIDAR system and the camera are a part of the harvester 106. Similar to FIGS. 4 and 5, FIGS. 11 and 12 show a crop material path 401 determined by a computing system (e.g., see any one of the computing systems described herein) that makes the determination by extrapolating points (e.g., see point 411) along an arc formed by a scanned in crop material flow. Also, similarly, the position of the arm portion 409 of the chute 218 and the position of the spout 219 controls a discharge direction 404 of the spout, the flow of the material starts in the discharge direction 404 and ends when it reaches an inner surface 402 of bin 420 of a receiving vehicle (e.g., see wagon 220). The computing system can estimate a landing point 403 based on the crop material path 401 and detection of the inner surface 402. The crop material flow (e.g., see stream of processed crop 226) and the inner surface 402 are detected by the LIDAR system 116 and the camera 117, which provides validation and enhancements in the detection of the flow and the inner surface. Also, shown in the FIGS. 4 and 5, the field of view of the LIDAR system 116 overlaps the field of view of the camera 117. The field of view of the camera 117 is limited by boundaries represented by dotted lines 1130a and 1130b. Both the LIDAR system 116 and the camera 117 are able to capture the crop material flow and the inner surface 402 of the bin 420 regardless of being position above the chute 218 or below the chute. As depicted, in some embodiments, the camera 117 is above the chute 218 and the LIDAR system 116 is below the chute; and in some other embodiments, the camera 117 is below the chute 218 and the LIDAR system 116 is above the chute.

Figure 13:
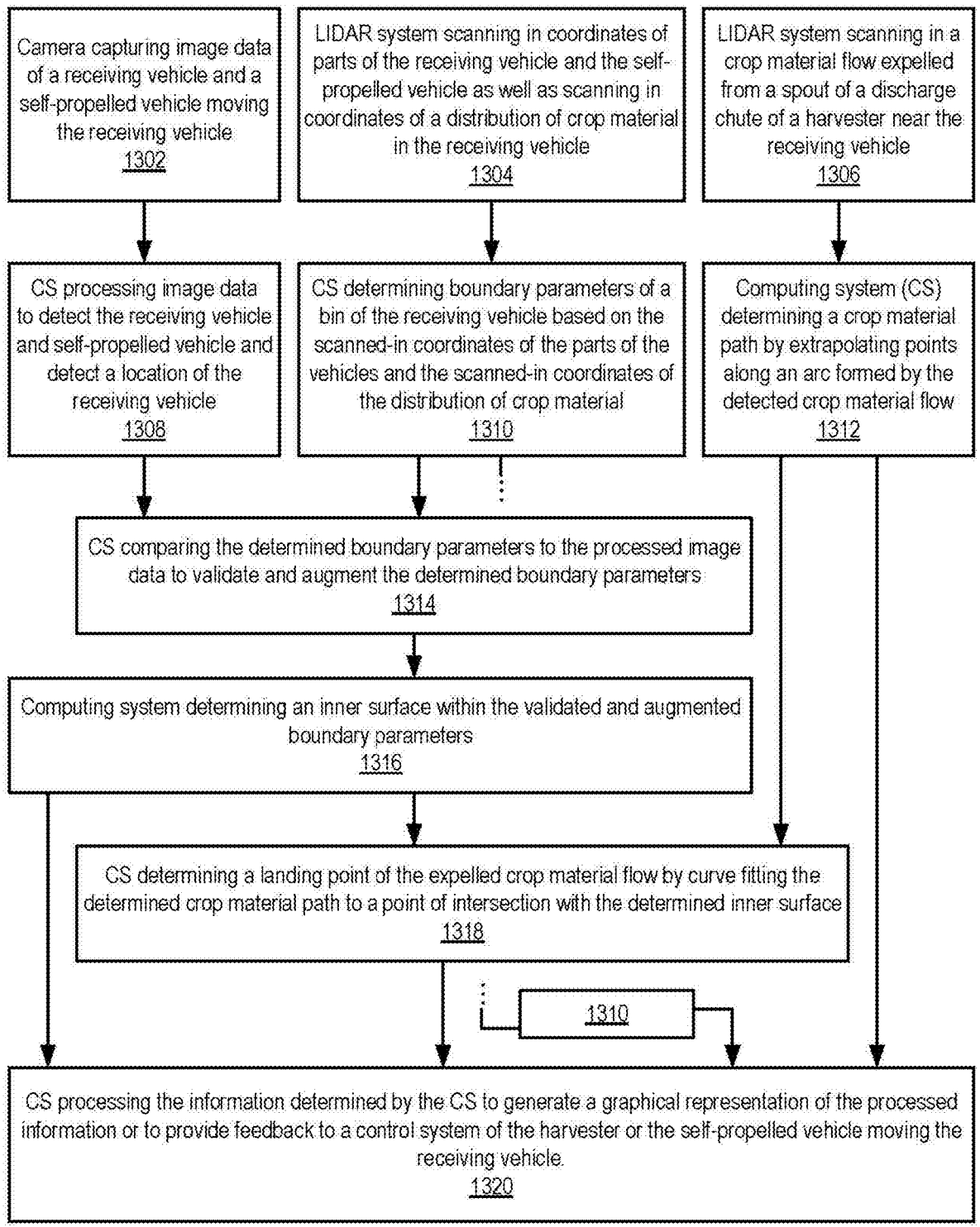
FIGS. 13 and 14 illustrate example methods for LIDAR and computer vision detection of path and landing position of crop material expelled from a forage harvester and use of such information as feedback for operating the harvester or the receiving vehicle, in accordance with some embodiments of the present disclosure.
Figure 14:
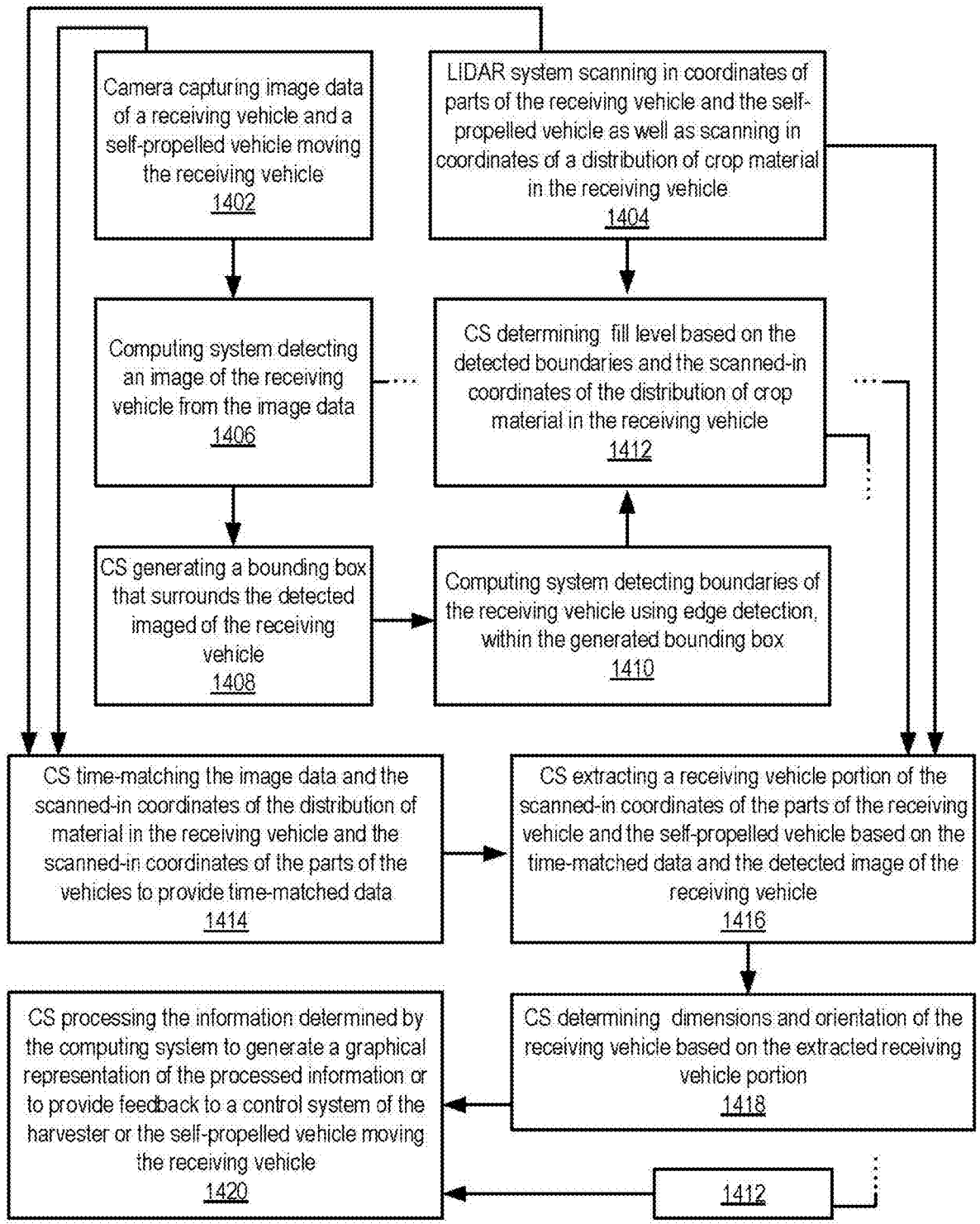

FIGS. 13 and 14 illustrate example methods 1300 and 1400 for LIDAR and computer vision detection of path and landing position of crop material expelled from a forage harvester (e.g., see harvester 106, as shown in FIG. 10, or harvester 200) and use of such information as feedback for operating the harvester or the receiving vehicle (e.g., see receiving vehicle 109 or wagon 220).

Method 1300 begins with a camera capturing image data of a receiving vehicle and a self-propelled vehicle moving the receiving vehicle, at step 1302. The method also begins with a LIDAR system scanning in coordinates of parts of the receiving vehicle and the self-propelled vehicle as well as scanning in coordinates of a distribution of crop material in the receiving vehicle, at step 1304. The method also starts with the LIDAR system scanning in a crop material flow expelled from a spout of a discharge chute of a harvester near the receiving vehicle, at step 1306.

The method 1300 continues with the computing system processing the captured image data to detect the receiving vehicle and the self-propelled vehicle moving the receiving vehicle and detect a location of the receiving vehicle relative to the harvester, at step 1308. The method 1300 also continues with the computing system determining boundary parameters of a bin of the receiving vehicle based on the scanned in coordinates of the parts of the receiving vehicle and the self-propelled vehicle and the scanned in coordinates of the distribution of crop material in the receiving vehicle, at step 1310. Also, the method 1300 continues with the computing system determining a crop material path by extrapolating points along an arc formed by the detected crop material flow, at step 1312.

At step 1314, the method 1300 continues with the computing system comparing the determined boundary parameters to the processed image data to validate and augment the determined boundary parameters. At step 1316, the method 1300 continues with the computing system determining an inner surface within the validated and augmented boundary parameters.

Also, the method 1300 continues with the computing system determining a landing point of the expelled crop material flow by curve fitting the determined crop material path to a point of intersection with the determined inner surface, at step 1318.

Finally, the method 1300 continues with the computing system processing the information determined by the computing system to generate a graphical representation of the processed information or to provide feedback to a control system of the harvester or the self-propelled vehicle moving the receiving vehicle, at step 1320. The determined information that is processed includes the determined boundary parameters of the bin, the determined crop material path, the determined inner surface, and the determined landing point of the crop material flow.

Method 1400 can be in addition to or an alternative of method 1300 and it begins with a camera on the harvester capturing image data of a receiving vehicle and a self-propelling vehicle moving the receiving vehicle, at step 1402. It also begins with a LIDAR system scanning in coordinates of parts of the receiving vehicle and the self-propelled vehicle as well as scanning in coordinates of a distribution of crop material in the receiving vehicle, at step 1404.

At step 1406, the method 1400 continues with a computing system detecting an image of the receiving vehicle from the image data. At step 1408, the method 1400 continues with generating, by the computing system, a bounding box that surrounds the detected imaged of the receiving vehicle. At step 1410, the method continues with the computing system detecting boundaries of the receiving vehicle using edge detection, within the generated bounding box.

At step 1412, the method 1400 continues with the computing system determining fill level based on the detected boundaries and the scanned in coordinates of the distribution of crop material in the receiving vehicle.

At step 1414, the method 1400 continues with the computing system time-matching the captured image data and the scanned in coordinates of the distribution of crop material in the receiving vehicle and the scanned in coordinates of the parts of the receiving vehicle and the self-propelled vehicle to provide time-matched data.

At step 1416, the method 1400 continues with the computing system extracting a receiving vehicle portion of the scanned in coordinates of the parts of the receiving vehicle and the self-propelled vehicle based on the time-matched data and the detected image of the receiving vehicle. At step 1418, the method 1400 continues with the computing system determining dimensions and orientation of the receiving vehicle based on the extracted receiving vehicle portion.

Finally, at step 1420, the method 1400 continues with the computing system processing the information determined by the computing system to generate a graphical representation of the processed information or to provide feedback to a control system of the harvester or the self-propelled vehicle moving the receiving vehicle. The determined information that is processed includes at least the determined dimensions and orientation of the receiving vehicle (determined at step 1418) and the determined fill level (determined at step 1412).

Figure 15:
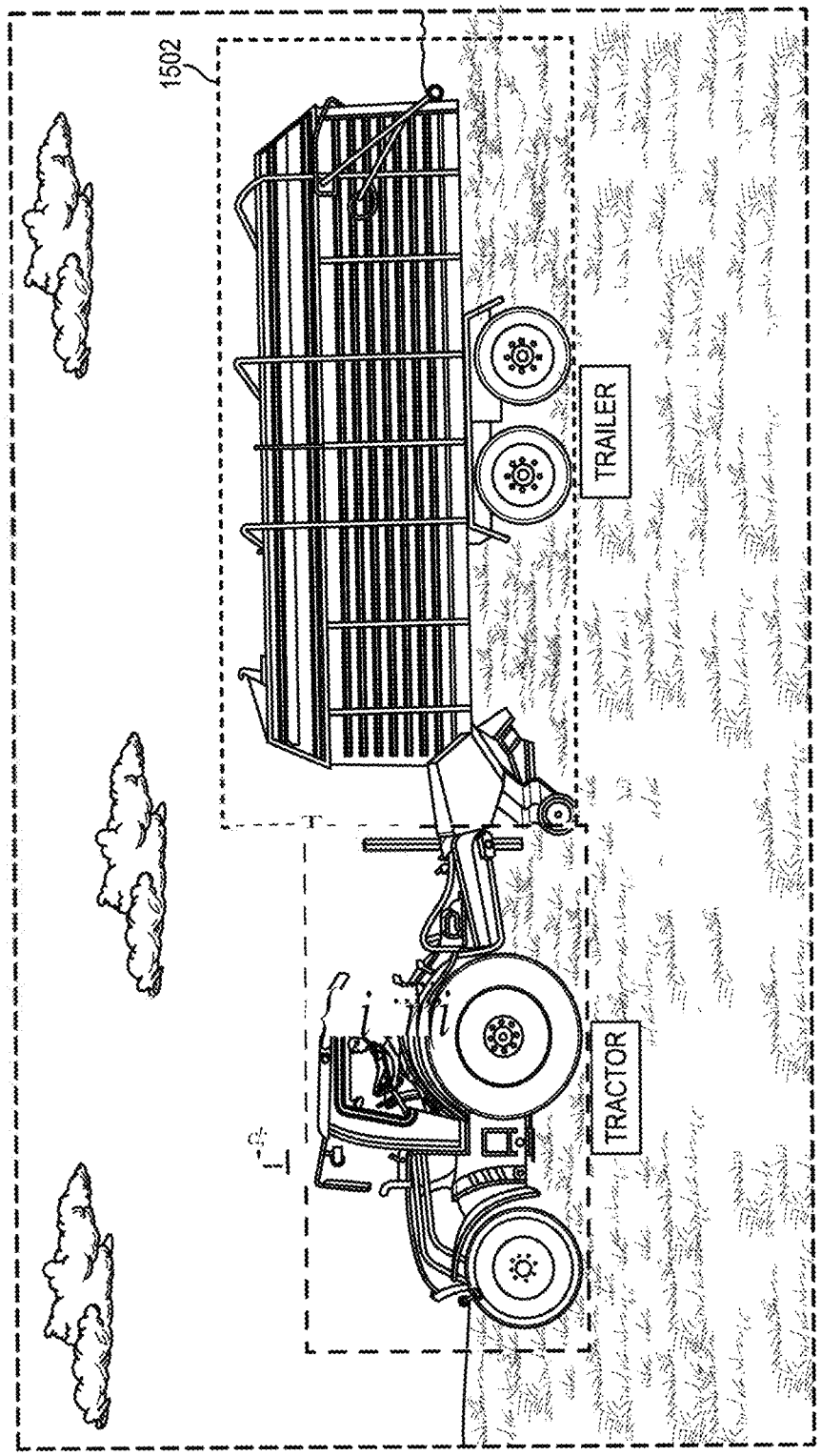
FIGS. 15, 16, and 17 illustrate computer generated images of at least the receiving vehicle and a tractor pulling the receiving vehicle that can be used by the computing systems described herein to validate the information obtained by the LIDAR system, in accordance with some embodiments of the present disclosure.
Figure 16:
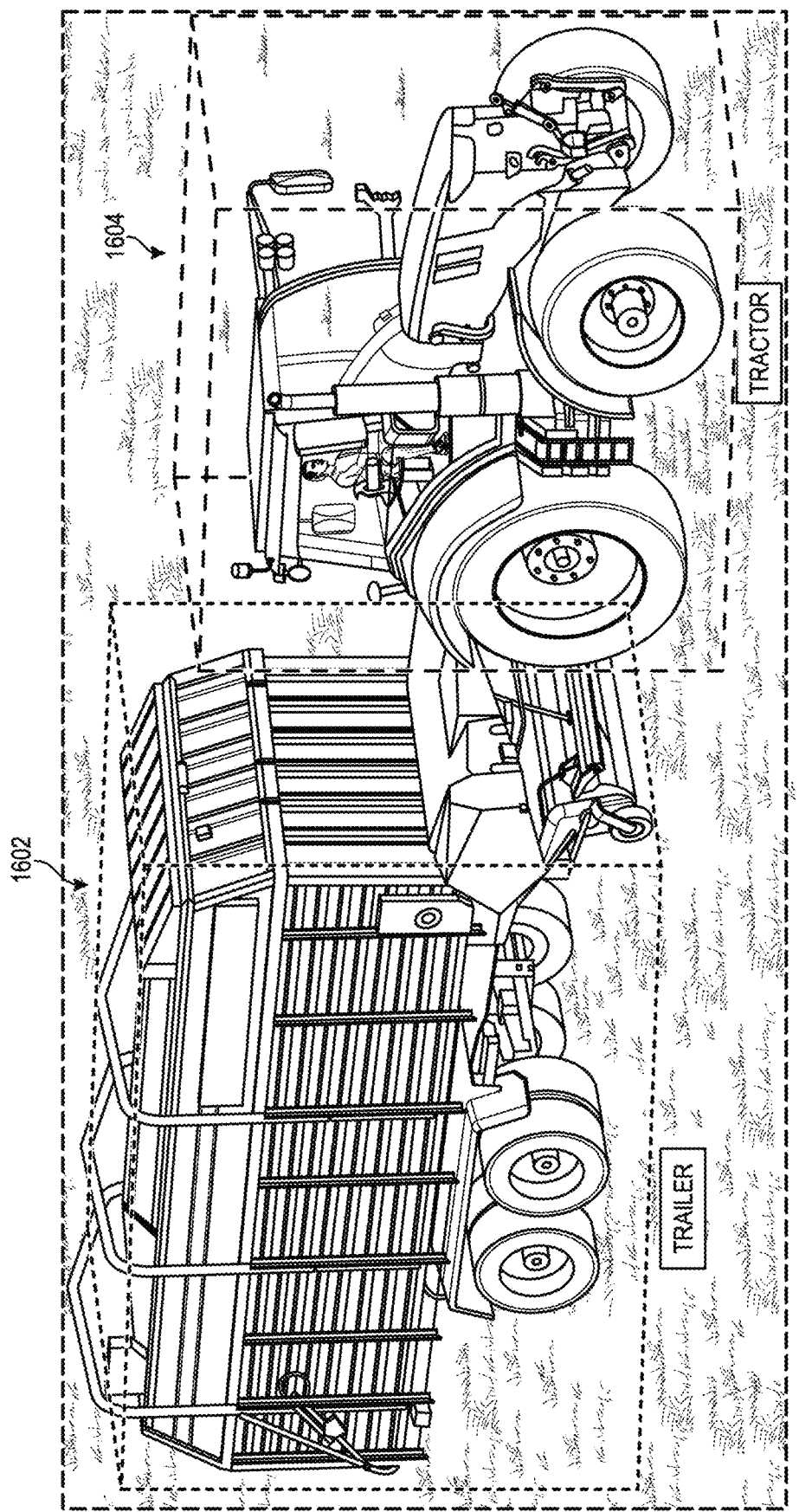
Figure 17:
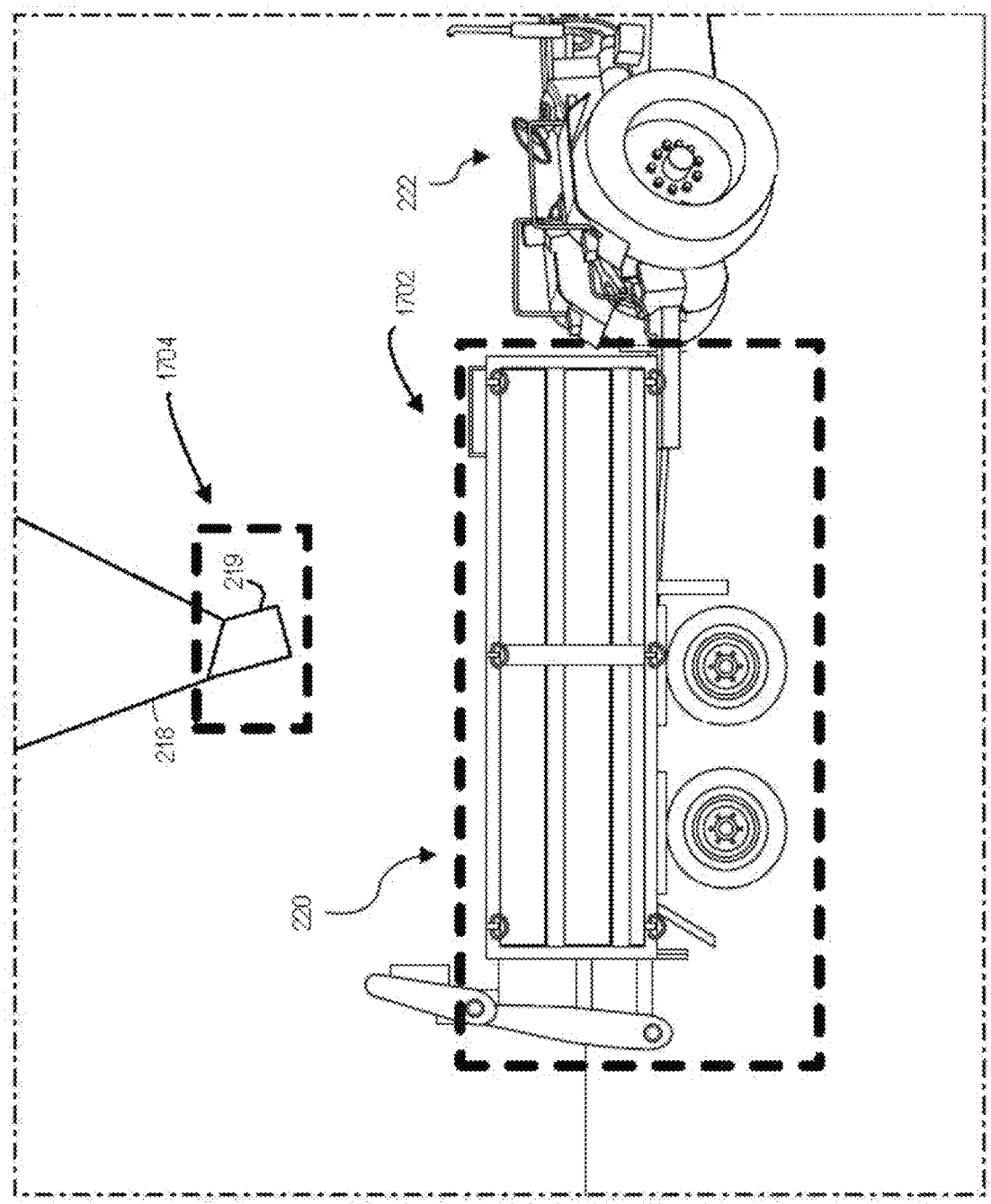

FIGS. 15, 16, and 17 illustrate computer generated images of at least the receiving vehicle and a tractor pulling the receiving vehicle that can be used by the computing systems described herein to validate the information obtained by the LIDAR system, in accordance with some embodiments of the present disclosure. Specifically, FIG. 15 shows computer vision generated bounding boxes 1502 and 1504 that are rectangular and graphically identify the detected image parts of the receiving vehicle and the tractor pulling the receiving vehicle, respectively, by at least partially surrounding the parts. FIG. 16 shows computer vision generated bounding boxes 1602 and 1604 that are rectangular cuboidal and graphically identify the detected image parts of the receiving vehicle and the tractor pulling the receiving vehicle, respectively, by at least partially surrounding the parts. FIG. 17 shows computer vision generated bounding boxes 1702 and 1704 that are rectangular and graphically identify the detected image parts of the receiving vehicle or wagon 220 and the spout 219 of the discharge chute 218, respectively, by at least partially surrounding the parts. Also, FIG. 17 shows tractor 222 pulling wagon 220.

FIGS. 18 and 19 illustrates a GUI 1800 including a graphical representation of relative positions of a harvester 1802 and a receiving vehicle 1804. Harvester 1802 can be any one of the harvesters described herein. Receiving vehicle 1804 can be any one of the receiving vehicles described herein. Any one of the computing systems described herein (which can include one or more computing devices) use the data generated by the LIDAR system (e.g., LIDAR system 116) and the camera (e.g., camera 117) to generate graphic data defining a graphical representation illustrating the relative positions of the discharge chute 1822 and spout 1824 of the harvester 1802 and the bin of the receiving vehicle 1804 and illustrating at least one of the fill level 1806 and the distribution of processed crop 1808 in the bin as well as the crop flow 1826 being expelled from the spout and into the bin. This graphical representation assists an operator in manually guiding either the tractor or the harvester 1802 (e.g., see harvester 200 and tractor 222) to align the discharge chute 1822, spout 1824, and crop flow 1826 with the bin of the receiving vehicle 1804. A visual representation of the fill level 1806 of the bin allows the operator to see whether or not the receiving vehicle is full and to estimate how much time is required to completely fill the receiving vehicle 1804. A visual representation of the distribution of crop in the bin allows the operator to see which portions of the bin are full and to adjust the position of the receiving vehicle 2804 relative to the chute 1822, spout 1824, and crop flow 1826 to fill portions of the bin with less crop.

The graphical representation can be presented on a user interface of the harvester 1802, on a user interface of the tractor moving the receiving vehicle 1804, on a user interface of a portable electronic device such as a table computer or a smartphone, or on any combination thereof (e.g., see the computing system 102 shown in FIG. 10). The harvester 1802 or any other harvester described herein can be in wireless communication with the receiving vehicle 1804 or any other type of receiving vehicle having wireless communication capabilities, and a computing system of the harvester 1802 (e.g., see computing system 126 shown in FIG. 10) generates and communicates the graphical representation to the receiving vehicle as a wireless communication. In such embodiments, the tractor includes an electronic system similar to that of the harvester 1802, including a communications gateway, a controller and a user interface. The harvester 1802 communicates the graphic data via the communications gateway of the harvester and the tractor receives the graphic data via the communications gateway of the tractor, wherein the user interface on the tractor generates the graphical representation from the graphic data and presents the graphical representation to the operator on the user interface.

The harvester 1802 or any harvester described herein can be in wireless communication with the receiving vehicle and with a portable electronic device (e.g., see computing system 102) wherein a computing device on the harvester generates and communicates the graphical representation to the receiving vehicle, to the portable electronic device, or both as a wireless communication. The portable electronic device can be placed in the operator cabin of the harvester, in the operator cabin of the tractor, or another location that is not in the harvester or in the tractor. In some embodiments, the portable electronic device receives the graphic data from the harvester 1802 or any other harvester described herein through a wireless transceiver on the portable electronic device.

The graphical representation is presented as part of a GUI on a portable electronic device in FIGS. 18 and 19 for illustration purposes, with the understanding that the graphical representation can be presented on a display that is part of a display console in the receiving vehicle 1804 or in the harvester 1802 or the tractor. The graphical representation of the receiving vehicle 1804, the harvester 1802 and their relative positions enables the operator of the tractor to guide the tractor to a location relative to the harvester 1802 where the bin of the receiving vehicle 1804 is properly aligned with the discharge chute 1822 and the spout 1824 as well as the crop flow 1826. The receiving vehicle 1804 and the harvester 1802 are depicted in an overhead view 1810 (that is, from a perspective directly above the machines and looking down) so that the operator can clearly see from the graphic representation the relative positions of the receiving vehicle and the harvester in the GUI 1800.

The fill level and distribution of the crop are also presented to the operator via the GUI 1800 via a side view 1812 of the receiving vehicle. The fill level 1806 depicts the fill level of the bin if the crop in the bin were evenly distributed. The curved line 1807 depicts the distribution of the crop enabling the operator to adjust the position of the bin relative to the chute 1822, spout 1824, and crop flow 1826 to fill areas of the bin where the level of the crop is lower. FIG. 19 depicts an alternative implementation of the graphical representation similar to that of FIG. 18, but where the graphical depiction of the receiving vehicle does not include the distribution of crop (only the fill level) and where the depiction of the receiving vehicle and the harvester includes concentric target lines around the graphical depiction of the spout of the discharge chute to assist the operator in aligning the chute with the bin of the receiving vehicle.

The embodiments of the GUI depicted in FIGS. 18 and 19 illustrate the chute 218 in a deployed position. As explained herein, however, the computing system can use data from the LIDAR system and the camera to detect the position of the chute relative to the body of the harvester 1802. The computing system use the data generated by the LIDAR system and the camera to determine the position of the chute 218 and generate the graphic data such that the graphical representation indicates the position of the chute relative to the body of the harvester 1802 and the receiving vehicle 1804. A visual indication of the position of the chute 218 helps the operator know when it is safe to begin unloading crop by enabling the operator to see when the spout of the chute 218 is positioned over the bin of the receiving vehicle 1804. In a fully or partially automated system the one or more computing devices use data from the LIDAR system and camera to determine the position of the chute 218 to ensure that crop transfer begins only when the chute 218 is in the proper position, to confirm the position of the chute as detected by other sensors, or both.

As shown in FIG. 18, captured image data and scanned in LIDAR data can be used by the computing system to determine when an actual amount of crop material within the bin has reached or exceeded a threshold amount. The threshold amount can be represented by fill level 1806. Processed image data includes the actual amount of crop material within a bin and an indication of whether the actual amount has reached or exceeds the threshold amount, and a generated graphic of the receiving vehicle includes the actual amount of crop material within the bin and the indication of whether the actual amount has reached or exceeds the threshold amount. In FIG. 18, the GUI 1800 provides an indication of the amount of crop material 1830 exceeding the threshold amount or level with warnings 1832. In some embodiments, a control system of a vehicle (such as the tractor) moving the receiving vehicle 1804 controls the vehicle to avoid or limit the exceeding of the threshold fill level. Similarly, a control system of the harvester 1802 can control the harvester to avoid or limit the filling of the bin to exceed the threshold fill level. The control systems can be configured to control steering and propulsion of the vehicles based on processed image data or processed LIDAR data or a combination thereof. The warnings 1832 of exceeding the threshold are shown in the overhead view 1810 as bolded "X" characters and in the side view 1812 of the GUI 1800 as triangles including an "!" character.

Also, shown in FIG. 18, the GUI 1800 in the overhead view 1810 provides fill levels of the crop within the bin of the receiving vehicle 1804. The different fill levels of the crop material are part of a topography of the crop material within the bin of the receiving vehicle and the generated receiving vehicle graphic includes a topography map 1840 of the topography of the crop material within the bin.

FIG. 19 also depicts the receiving vehicle 1804 and the harvester 1802 along with concentric target lines 1850 around the graphical depiction of an end of the crop flow 1826 being dispensed from the spot 1824 of the chute 1822 to assist the operator in aligning the end of the crop flow with a position in the bin of the receiving vehicle.

Figure 20:
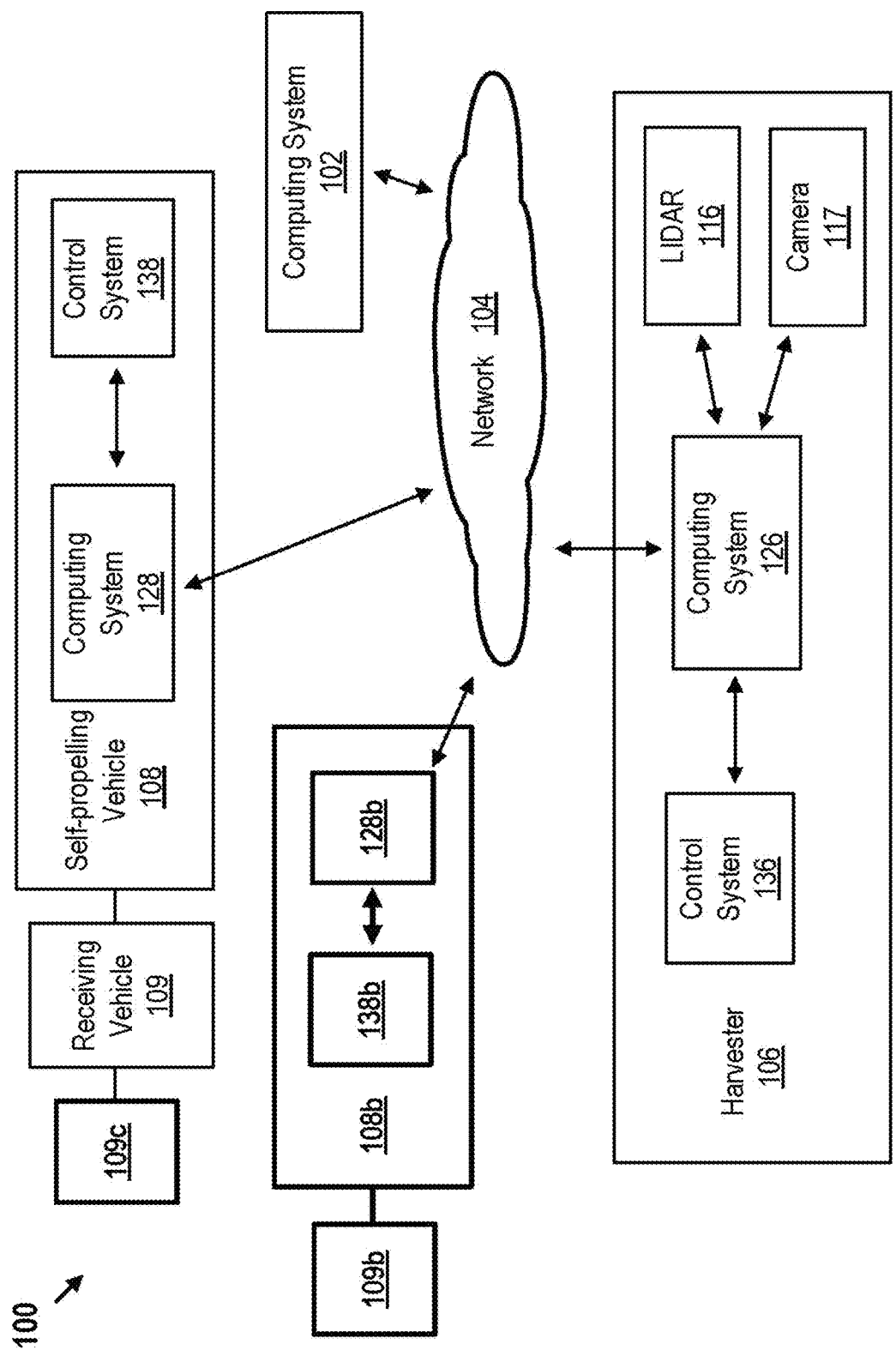
FIG. 20 illustrates the network shown in FIGS. 1 and 10, wherein the network includes multiple receiving vehicles and respective self-propelling vehicles as well as computing and control systems thereof, in accordance with some embodiments of the present disclosure.

FIG. 20 illustrates the network 100, wherein the network includes multiple receiving vehicles in a group (e.g., see vehicles 109, 109*b*, and 109*c*) and respective self-propelling vehicles (e.g., see vehicles 108 and 108*b*) as well as computing and control systems thereof (e.g., see computing systems 128 and 128*b* and control systems 138 and 138*b*). Also, the network 100 shown in FIG. 20 includes the harvester 106 that includes LIDAR system 116 and camera 117, and wherein the data captured by the camera verifies data captured by the LIDAR system and further enhances detecting crop material path and landing position of a harvester output and using such information for feedback control of the harvester, the multiple receiving vehicles, and the self-propelling vehicles moving the receiving vehicles.

As shown, the computing systems in network 100 communicate with and through the communication network 104. Also shown, the self-propelling vehicles each include a respective computing system. However, it is to be understood that the receiving vehicles can also include computing systems. And, in some embodiments, as shown, a self-propelling vehicle that moves a receiving vehicle can also move multiple receiving vehicles (e.g., see self-propelling vehicle 108 and receiving vehicles 109 and 109*c* which are attached and moved by the self-propelling vehicle 108).

With respect to FIG. 20, some embodiments include an apparatus that includes a camera 117, a LIDAR system 116, and a computing system (e.g., see computing system 102, 126, or 128). In some embodiments, the camera 117 can include multiple cameras that are positioned in different areas of a harvester. In general, the one or more cameras are configured to capture image data of a group of receiving vehicles and one or more self-propelled vehicles moving the group of receiving vehicles near the harvester. The LIDAR system 116 is configured to scan in coordinates of respective parts of the group of receiving vehicles and the vehicle(s) as well as scan in coordinates of respective distributions of crop material in each receiving vehicle of the group of receiving vehicles. The LIDAR is also configured to scan in a crop material flow expelled from a spout of a discharge chute of the harvester.

The computing system is configured to determine a crop material path by extrapolating points along an arc formed by the scanned in crop material flow and determine boundary parameters of a bin of a selected receiving vehicle of the group of receiving vehicles based on: (i) a receiving vehicle parts subset of the scanned in coordinates of the parts of the group of receiving vehicles, associated with parts of the selected receiving vehicle, and (ii) a receiving vehicle crop distribution subset of the scanned in coordinates of the distributions of crop material of the group of receiving vehicles, associated with a crop distribution of the selected receiving vehicle. The computing system is also configured to process the captured image data to detect the group of receiving vehicles and the vehicle(s) moving the group of receiving vehicles and detect a location of the selected receiving vehicle and respective locations of other receiving vehicles in the group of receiving vehicles relative to the harvester. Also, the computing system is configured to compare the determined boundary parameters to the processed image data to validate and augment the determined boundary parameters as well as determine an inner surface of the bin of the selected receiving vehicle within the validated and augmented boundary parameters. The computing system is also configured to determine a landing point of the expelled crop material flow by curve fitting the determined crop material path to a point of intersection with the determined inner surface. And, finally, the computing system is configured to process information determined by the computing system to generate a graphical representation of the processed information or to provide feedback to a control system of the harvester or the vehicle(s) moving the group of receiving vehicles, wherein the processed information includes the determined crop material path, the determined boundary parameters, the determined inner surface, and the determined landing point.

In some embodiments of the apparatus shown in FIG. 20, the computing system is configured to further process the captured image data to determine different fill levels of crop material at different regions within a receiving vehicle for each receiving vehicle of the group of receiving vehicles. And, the computing system is also configured to generate a receiving vehicle graphic for each receiving vehicle of the group of receiving vehicles, which includes a fill graphic of different fill levels of crop material, based on the further processed image data. Further, the computing system is configured to generate a GUI including the generated receiving vehicle graphics and the graphical representation of the processed information. In such embodiments and others, in the further processing of the captured image data, the computing system is configured to, for each receiving vehicle of the group of receiving vehicles, determine when an actual amount of crop material within a receiving vehicle has reached or exceeded a threshold amount. Also, for each receiving vehicle of the group of receiving vehicles, the further processed image data includes the actual amount of crop material within a receiving vehicle and an indication of whether the actual amount has reached or exceeds the threshold amount. And, for each generated receiving vehicle graphic of the generated receiving vehicle graphics, a generated receiving vehicle graphic includes the actual amount of crop material within the receiving vehicle and the indication of whether the actual amount has reached or exceeds the threshold amount.

In some embodiments of the apparatus shown in FIG. 20, the generated GUI includes an overhead view including the generated receiving vehicle graphics and the graphical representation of the processed information. Also, in some instances, the generated GUI includes a side view of the graphical representation of the processed information. And, in more complex examples, the generated GUI includes a side view of the harvester and an overhead view of the harvester. In such examples, for each receiving vehicle of the group of receiving vehicles, the determined different fill levels of crop material are part of a topography of the crop material within the bin of the receiving vehicle and the generated receiving vehicle graphic includes a topography map of the topography of the crop material within the bin.

In some embodiments of the apparatus shown in FIG. 20 as well as other embodiments, for each receiving vehicle of the group of receiving vehicles, the determined different fill levels of crop material are part of a topography of the crop material within the bin of the receiving vehicle and the generated receiving vehicle graphic includes a topography map of the topography of the crop material within the bin.

In some embodiments of the apparatus shown in FIG. 20, the computing system is configured to detect an image of the selected receiving vehicle, in the processing of the captured image data. And, it is also configured to generate a bounding box that surrounds the detected imaged of the selected receiving vehicle and detect boundaries of the selected receiving vehicle using edge detection—within the generated bounding box. Further, it is also configured to compare the determined boundary parameters of the bin of the selected receiving vehicle—, which were based on the scanned in coordinates—to the detected boundaries of the selected receiving vehicle within the generated bounding box to validate or augment the determined boundary parameters and to enhance the determination of the inner surface of the bin.

In some embodiments of the apparatus shown in FIG. 20, the apparatus includes a control system of the harvester, and the control system of the harvester is configured to control a discharge direction of the spout of the discharge chute of the harvester based on the processed information determined by the computing system. In such examples, the discharge direction is a direction in which the spout expels the crop material. Also, in such examples, the control of the discharge direction is at least partially based on the processed image data, the determined landing point, and a target landing point of the crop material, and the control system is configured to determine, via the computing system, control parameters of parts of the discharge chute to control the discharge direction based on the processed image data, the determined landing point, and the target landing point.

In some embodiments of the apparatus shown in FIG. 20, the computing system is configured to further process the captured image data to determine different fill levels of crop material at different regions within a receiving vehicle for each receiving vehicle of the group of receiving vehicles, which includes to determine different fill levels of crop material at different regions within the bin of the selected receiving vehicle. It is also configured to determine the target landing point according to the determined different fill levels within the bin of the selected receiving vehicle.

In some embodiments of the apparatus shown in FIG. 20, the apparatus includes the discharge chute of the harvester. The discharge chute includes a joint, configured to join the spout to an arm portion of the discharge chute. The chute also includes a position feedback sensor is on or near the joint and configured to sense a position of the spout relative to the arm portion of the discharge chute. The control of the discharge direction, by the control system, is further based on the sensed position of the spout, and the computing system is configured to determine a control parameter of the joint based on the sensed position of the spout, the determined landing point, and the target landing point.

In some embodiments of the apparatus shown in FIG. 20, the joint is a first joint, the position feedback sensor is a first position feedback sensor, and the discharge chute includes a second joint and a second position feedback sensor. The second joint is configured to join the arm portion to a base portion of the discharge chute. The base portion of the discharge chute is attached to a main body portion of the harvester. The second position feedback sensor is on or near the second joint and configured to sense a position of the arm portion relative to the base portion of the discharge chute. The control of the discharge direction, by the control system, is further based on the sensed position of the arm portion, and the computing system is configured to determine a control parameter of the second joint based on the sensed position of the arm portion, the determined landing point, and the target landing point.

In some embodiments of the apparatus shown in FIG. 20, the LIDAR system and the camera(s) are mounted to the discharge chute, and the discharge chute is configured to pivot on the harvester horizontally. In some instances, the LIDAR system is mounted above the spout of the discharge chute and the camera is mounted below the spout. Or, the LIDAR system is mounted below the spout of the discharge chute and the camera is mounted above the spout.

In some embodiments of the apparatus shown in FIG. 20, the determined landing point is an estimated impact point between the expelled material and the determined inner surface, and the determined inner surface includes crop material or a wall of the bin of the receiving vehicle.

In some embodiments of the apparatus shown in FIG. 20, the apparatus includes a control system of the vehicle(s) moving the group of receiving vehicles. In the further processing of the captured image data, the computing system is configured to, for each receiving vehicle of the group of receiving vehicles, determine when an actual amount of crop material within a receiving vehicle has reached or exceeded a threshold amount. And, for each receiving vehicle of the group of receiving vehicles, the further processed image data includes the actual amount of crop material within a receiving vehicle and an indication of whether the actual amount has reached or exceeds the threshold amount. In such embodiments, the control system of the vehicle(s) is configured to control steering and propulsion of the vehicle(s) based on the further processed image data.

Also, with respect to FIG. 10, some embodiments of an apparatus include one or more cameras, configured to capture image data of a group of receiving vehicles and one or more vehicles moving the group of receiving vehicles near a harvester as well as a LIDAR system and a computing system. The LIDAR system is configured to scan in coordinates of respective parts of the group of receiving vehicles and the vehicle(s) and scan in coordinates of respective distributions of crop material in each receiving vehicle of the group of receiving vehicles. The LIDAR system is also configured to scan in a crop material flow expelled from a spout of a discharge chute of the harvester.

The computing system, configured to detect an image of a selected receiving vehicle of the group of receiving vehicles from the image data. It is also configured to generate a bounding box that surrounds the detected imaged of the selected receiving vehicle. The bounding box is either a rectangular cuboid or a rectangle, in some embodiments. The computing system is also configured to detect boundaries of the selected receiving vehicle using edge detection, within the generated bounding box. Also, the computing system is configured to estimate fill level based on the detected boundaries and the scanned in coordinates of the distribution of crop material in the selected receiving vehicle. The computing system is also configured to time-match the captured image data and the scanned in coordinates of the distribution of crop material in the selected receiving vehicle and the scanned in coordinates of the parts of the selected receiving vehicle to provide time-matched data. And, it is also configured to extract a receiving vehicle portion of the scanned in coordinates of the parts of the selected receiving vehicle based on the time-matched data and the detected image of the selected receiving vehicle. It is also configured to estimate dimensions and orientation of the selected receiving vehicle based on the extracted receiving vehicle portion. And, it is also configured to estimate a landing point of the expelled crop material flow in the selected receiving vehicle by curve fitting a determined crop material path to a point of intersection with a determined inner surface. The determined crop material path is determined according to the detected crop material flow expelled from the spout of the discharge chute of the harvester. The computing system is further configured to process information estimated by the computing system to control the vehicle(s) moving the group of receiving vehicles. The processed information includes the estimated fill level, the estimated dimensions and orientation of the selected receiving vehicle, and the estimated landing point In such embodiments, the apparatus also includes a control system of the harvester or the vehicle(s) moving the group of receiving vehicles. The control system is configured to control steering and propulsion of the harvester or the vehicle(s), respectively, based on the processed information estimated by the computing system.

Figure 21:
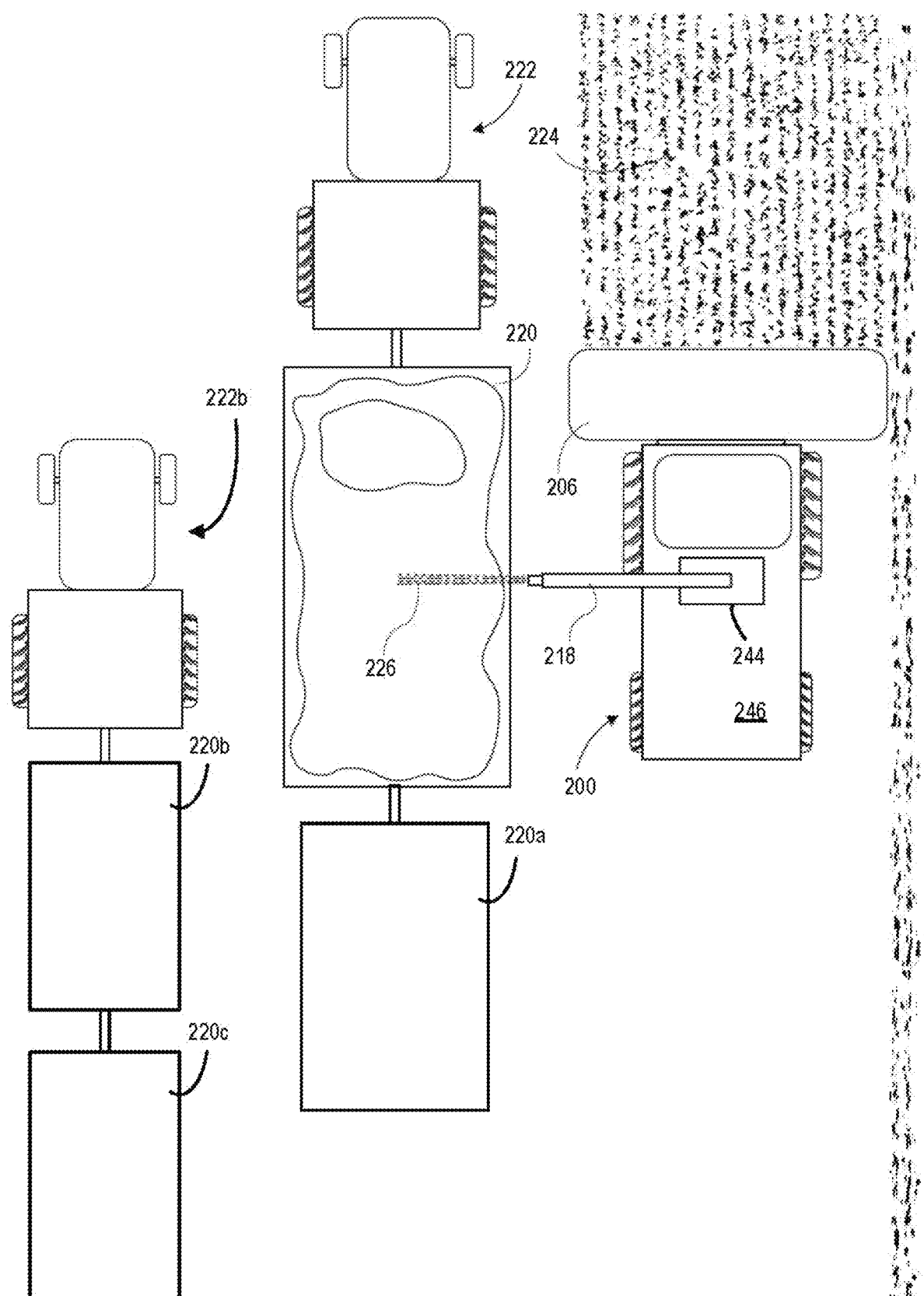
FIG. 21 illustrates the forage harvester of FIGS. 2 and 3 harvesting crop and transferring a stream of processed crop to a receiving vehicle that is part of a group of receiving vehicles, in accordance with some embodiments of the present disclosure.

FIG. 21 illustrates the forage harvester 200 harvesting crop 224 and transferring a stream of processed crop 226 to wagon 220 that is part of a group of receiving vehicles. The group of receiving vehicles includes wagons 220, 220a, and 220c. Wagon 220 and 220a are being pulled by tractor 222 and the wagons 220b and 220c are being pulled by tractor 222b. In operation, the forage harvester 200 advances through a field cutting the crop 224 standing in the field and processes the crop. As shown, the processed crop is being transferred from the forage harvester 200 to the wagon 220 by way of the discharge chute 218. As the wagon 220 is being filled, the tractor 222 and wagon 220 follow the forage harvester 200 through the field. As soon as the wagon 220 is finished being filled (such as when the fill level of the bin of the wagon reaches a threshold fill amount), the tractor 222 pulls the wagon 220 away so that the wagon 220a receiving vehicle behind wagon 220 can be moved into place for receiving the crop blown from the chute 218. As soon as wagon 220a is filled, tractor 222 can move it out of the way for a wagon 220b to be filled and then wagon 220c to be filled. Tractor 22b moves wagons 220b and 220a into place under or near the chute 218 when each wagon is determined to be filled by an operator of the tractors or the harvester or by an automated process controlled by one or more control systems.

Figure 24:
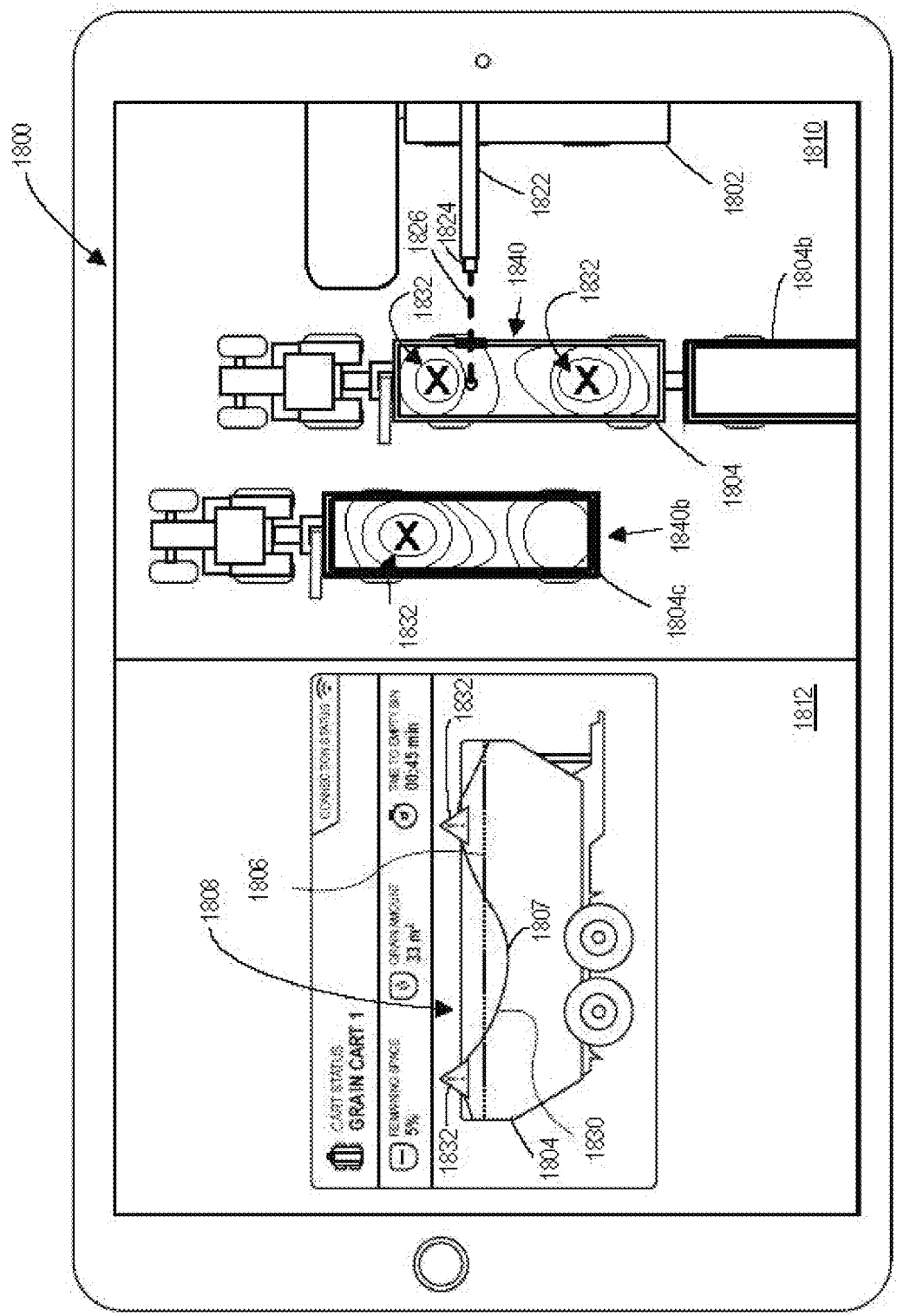
FIG. 24 illustrates a GUI including a graphical representation of relative positions of an agricultural harvester and part of a group of receiving vehicles, in accordance with some embodiments of the present disclosure.

The forage harvester 200 includes an onboard electronic system with similar components to a possible combination of the control system 136 and the computing system 126 which, in some embodiments, includes a controller, position determining device, user interface, sensors, actuators, storage components, input/output ports, a communications gate, a first electromagnetic detecting and ranging module 228 and a second electromagnetic detecting and ranging module 230. The modules 228 and 230 each can include a respect LIDAR system along with corresponding one or more computing devices, to detect and track a location of receiving vehicles (such as the wagons 220, 220a, 220b, and 220c) of a group of receiving vehicles and the fill levels and content distribution of crop material within each receiving vehicle of the group. The data collected by the modules 228 and 230 is used to generate a graphical representation of the chute 218 of the harvester 200 and the receiving vehicle that is presented to an operator of either the harvester 200 or the tractor 222 by way of a GUI (e.g., see GUI 1800 as shown in FIG. 24). Also, the data collected by the modules 228 and 230 can be used to generate guidance data used by at least one of the harvester 200 and the receiving vehicle to automatically guide at least one of the vehicles to maintain proper alignment of the unload conveyor 216 with the receiving vehicle. The respective control systems of the agricultural vehicles can provide such automation (e.g., see control systems 136 and 138).

Figure 22:
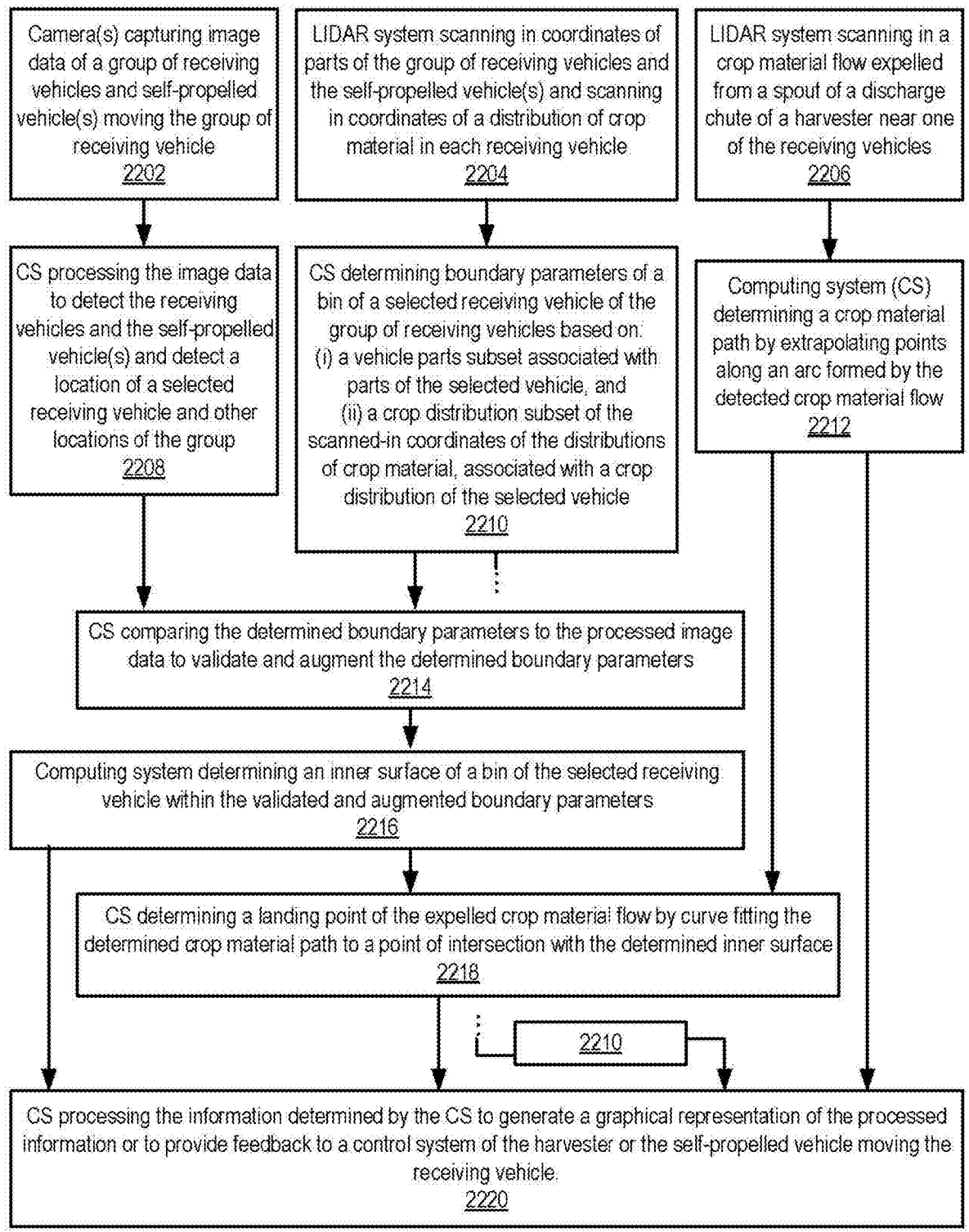
FIGS. 22 and 23 illustrate example methods for LIDAR and computer vision detection of path and landing position of crop material expelled from a forage harvester and use of such information as feedback for operating the harvester and multiple receiving vehicles in a group, in accordance with some embodiments of the present disclosure.
Figure 23:
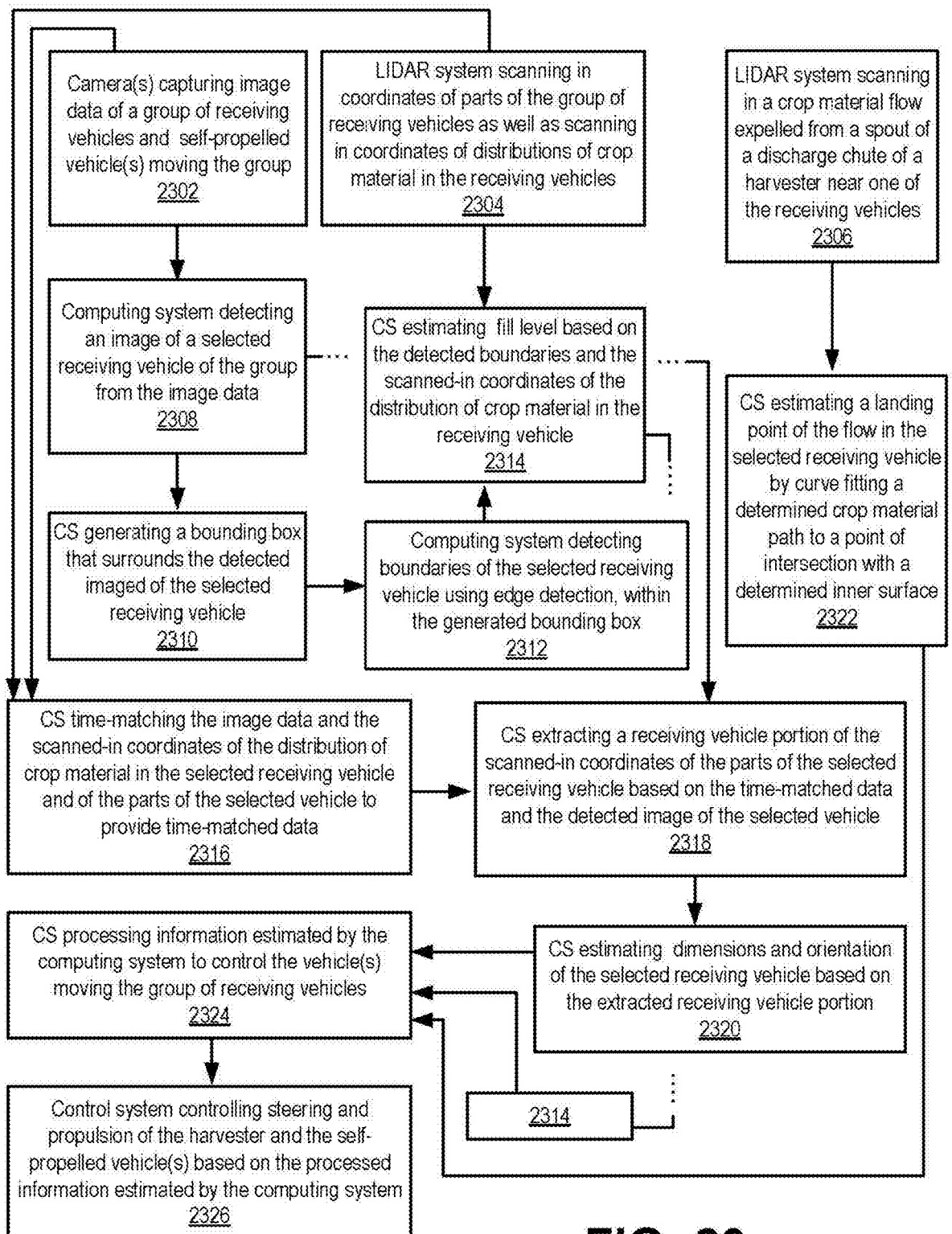

FIGS. 22 and 23 illustrate methods 2200 and 2300 for LIDAR and computer vision detection of path and landing position of crop material expelled from a forage harvester (e.g., see harvester 106, as shown in FIG. 20, or harvester 200 as shown in FIG. 21) and use of such information as feedback for operating the harvester and multiple receiving vehicles in a group (e.g., see receiving vehicles 109, 109b, and 109c or wagons 220, 220a, 220b, and 220c).

Method 2200 begins with one or more cameras captures image data of a group of receiving vehicles and one or more vehicles moving the group of receiving vehicles near a harvester, at step 2202. The method 2200 also begins with a LIDAR system scanning in coordinates of respective parts of the group of receiving vehicles and the vehicle(s) as well as scanning in coordinates of respective distributions of crop material in each receiving vehicle of the group of receiving vehicles, at step 2204. Also, the method begins with the LIDAR system scanning in a crop material flow expelled from a spout of a discharge chute of the harvester near one of the receiving vehicles, at step 2206.

The method 2200 continues with a computing system processing the captured image data to detect the group of receiving vehicles and the vehicle(s) moving the group of receiving vehicles and detect a location of a selected receiving vehicle and respective locations of other receiving vehicles in the group of receiving vehicles relative to the harvester, at step 2208. At step 2210, the method 2200 continues with the computing system determining boundary parameters of a bin of a selected receiving vehicle of the group of receiving vehicles based on: (i) a receiving vehicle parts subset of the scanned in coordinates of the parts of the group of receiving vehicles, associated with parts of the selected receiving vehicle, and (ii) a receiving vehicle crop distribution subset of the scanned in coordinates of the distributions of crop material of the group of receiving vehicles, associated with a crop distribution of the selected receiving vehicle. And, the method continues with the computing system determining a crop material path by extrapolating points along an arc formed by the detected crop material flow, at step 2212.

Then, the method 2200 continues with the computing system comparing the determined boundary parameters to the processed image data to validate and augment the determined boundary parameters, at step 2214. The method 2200 also continues with the computing system determining an inner surface of the bin of the selected receiving vehicle within the validated and augmented boundary parameters, at step 2216. Also, the method 2200 continues with the computing system determining a landing point of the expelled crop material flow by curve fitting the determined crop material path to a point of intersection with the determined inner surface, at step 2218.

Finally, the method 2200 continues with the computing system processing information determined by the computing system to generate a graphical representation of the processed information or to provide feedback to a control system of the harvester or the vehicle(s) moving the group of receiving vehicles. The processed information includes the determined crop material path, the determined boundary parameters, the determined inner surface, and the determined landing point.

Method 2200 begins at step 2302, which includes capturing, by one or more cameras, image data of a group of receiving vehicles and one or more vehicles moving the group of receiving vehicles near a harvester. The method also begins at step 2304, which includes scanning in, by a LIDAR system, coordinates of respective parts of the group of receiving vehicles and the vehicle(s) as well as scanning in, by the LIDAR system, coordinates of respective distributions of crop material in each receiving vehicle of the group of receiving vehicles. The method also begins at step 2306, which includes scanning in, by the LIDAR system, a crop material flow expelled from a spout of a discharge chute of the harvester.

The method 2200 continues at step 2308, which includes detecting, by a computing system, an image of a selected receiving vehicle of the group of receiving vehicles from the image data. It also continues at step 2310, which includes generating, by the computing system, a bounding box that surrounds the detected imaged of the selected receiving vehicle, wherein the bounding box is either a rectangular cuboid or a rectangle. Also, the method continues at step 2312, which includes detecting, by the computing system, boundaries of the selected receiving vehicle using edge detection, within the generated bounding box. At step 2314, the method 2200 includes estimating, by the computing system, fill level based on the detected boundaries and the scanned in coordinates of the distribution of crop material in the selected receiving vehicle.

At step 2316, the method 2200 includes time-matching, by the computing system, the captured image data and the scanned in coordinates of the distribution of crop material in the selected receiving vehicle and the scanned in coordinates of the parts of the selected receiving vehicle to provide time-matched data. And, at step 2318, the method includes extracting, by the computing system, a receiving vehicle portion of the scanned in coordinates of the parts of the selected receiving vehicle based on the time-matched data and the detected image of the selected receiving vehicle. The method then continues at step 2320, which includes estimating, by the computing system, dimensions and orientation of the selected receiving vehicle based on the extracted receiving vehicle portion.

At step 2322, the method 2300 continues and includes estimating, by the computing system, a landing point of the expelled crop material flow in the selected receiving vehicle by curve fitting a determined crop material path to a point of intersection with a determined inner surface of the selected vehicle (e.g., see step 1316 of method 1300 for the determining of the inner surface). The determined crop material path is determined according to the scanned in crop material flow expelled from the spout of the discharge chute of the harvester (e.g., see step 1312 of method 1300).

At step 2324, the method 2300 continues and includes processing, by the computing system, information estimated by the computing system to control the vehicle(s) moving the group of receiving vehicles. The processed information includes the estimated fill level, the estimated dimensions and orientation of the selected receiving vehicle, and the estimated landing point.

At step 2326, the method 2300 continues and includes controlling, by a control system of the harvester and the vehicle(s) moving the group of receiving vehicles, steering and propulsion of the harvester and the vehicle(s) based on the processed information estimated by the computing system. Also, in some embodiments, the method includes generating a GUI based on the processed information estimated by the computing system (not depicted in FIG. 23).

FIG. 24 illustrates the GUI 1800 including a graphical representation of relative positions of the harvester 1802 and part of a group of receiving vehicles, e.g., see receiving vehicles 1804, 1804a, and 1804b. As mentioned herein, captured image data and scanned in LIDAR data can be used by the computing system to determine when an actual amount of crop material within the bin has reached or exceeded a threshold amount. The threshold amount can be represented by fill level 1806. With respect to FIG. 20 and FIG. 24, the processed image data includes the actual amount of crop material within one or more bins of the group of receiving vehicles and one or more indications of whether the actual amounts have reached or exceed the threshold amount, and a generated graphic of each receiving vehicle includes the actual amount of crop material within the bin and the indication of whether the actual amount has reached or exceeds the threshold amount, e.g., see warnings 1832 as shown in FIG. 24.

In FIG. 24, the GUI 1800 provides an indication of the amount of crop material 1830 exceeding the threshold amount or level with warnings 1832. In some embodiments, respective control systems of one or more vehicles (such as the tractors shown in FIG. 24) moving the receiving vehicles 1804, 1804b, and 1804c controls the vehicle to avoid or limit the exceeding of the threshold fill level. Similarly, a control system of the harvester 1802 can control the harvester to avoid or limit the filling of a bin to exceed the threshold fill level, for each respective bin of the group of receiving vehicles. The control systems can be configured to control steering and propulsion of the agricultural vehicles based on processed image data or processed LIDAR data or a combination thereof. The warnings 1832 of exceeding the threshold are shown in the overhead view 1810 as bolded "X" characters and in the side view 1812 of the GUI 1800 as triangles including an "!" character.

Also, shown in FIG. 24, the GUI 1800 in the overhead view 1810 provides fill levels of the crop within the bins of the receiving vehicles 1804, 1804b, and 1804c, respectively. As shown, multiple fill levels are depicted in the bin of receiving vehicles 1804 and 1804c. In the bin of receiving vehicle 1804b, no fill levels are shown signifying the bin has not been filled by the harvester. The different fill levels of the crop material are part of a topography of the crop material within each of the filled bins of the receiving vehicles 1804 and 1804c, and the generated receiving vehicle graphic includes a topography map 1840 and 1840b of the topography of the crop material within the bins, respectively.

Figure 25:
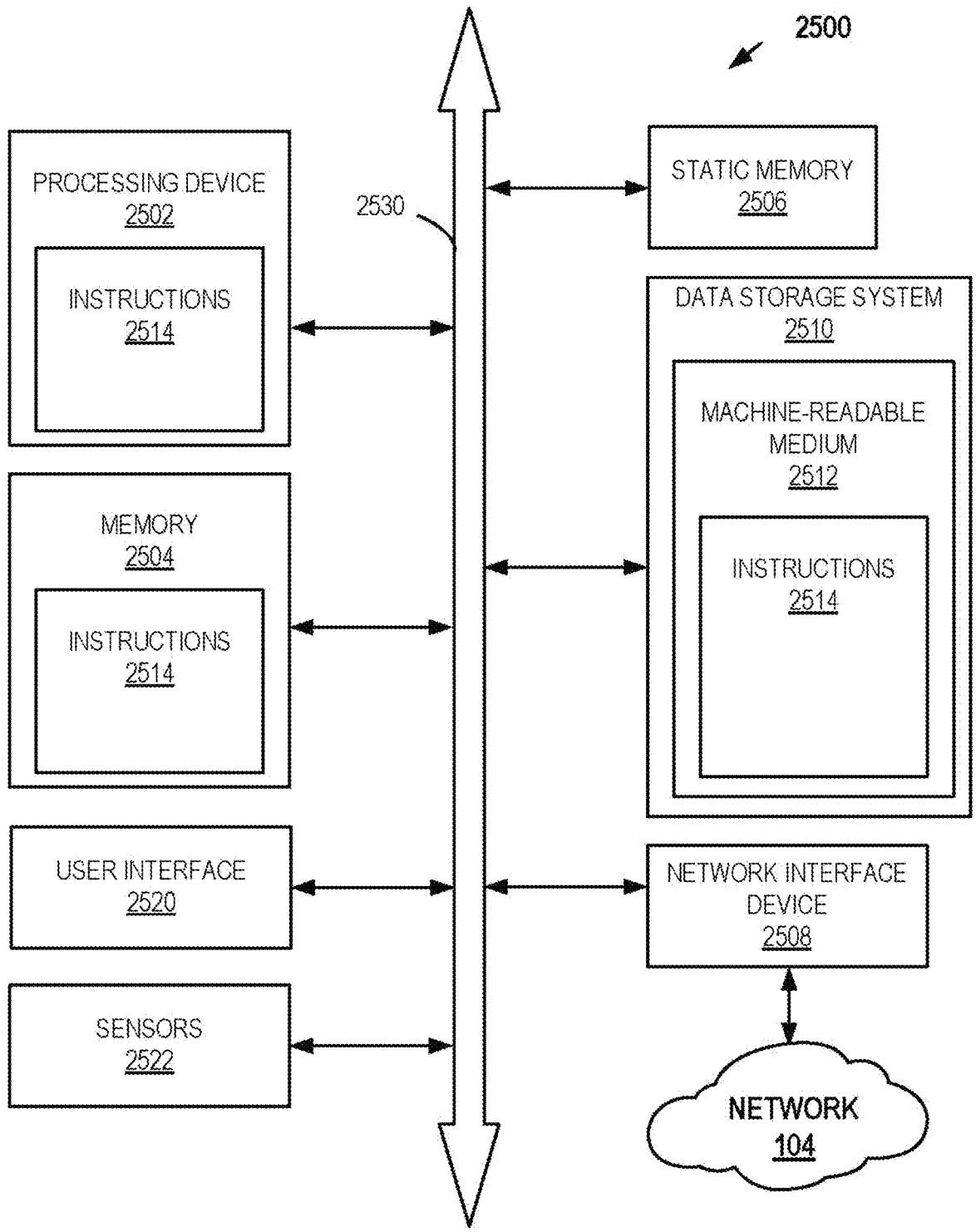
FIG. 25 illustrates a block diagram of example aspects of a computing system (such as shown by computing system 102 in FIG. 1) or a computing system locally connected to or integrated with a networked vehicle (such as computing systems 126 and 128), in accordance with some embodiments of the present disclosure.

FIG. 25 illustrates a block diagram of example aspects of a computing system (such as shown by computing system 102 in FIG. 1) or a computing system locally connected to or integrated with a networked vehicle (such as computing systems 126 and 128), in accordance with some embodiments of the present disclosure.

FIG. 25 illustrates parts of the computing system 2500 within which a set of instructions, for causing the machine to perform any one or more of the methodologies discussed herein, are executed. In some embodiments, the computing system 2500 corresponds to a host system that includes, is coupled to, or utilizes memory or is used to perform the operations performed by any one of the computing devices, data processors, user interface devices, and sensors described herein. In alternative embodiments, the machine is connected (e.g., networked) to other machines in a LAN, an intranet, an extranet, or the Internet. In some embodiments, the machine operates in the capacity of a server or a client machine in client-server network environment, as a peer machine in a peer-to-peer (or distributed) network environment, or as a server or a client machine in a cloud computing infrastructure or environment. In some embodiments, the machine is a personal computer (PC), a tablet PC, a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computing system 2500 includes a processing device 2502, a main memory 2504 (e.g., read-only memory (ROM), flash memory, dynamic random-access memory (DRAM), etc.), a static memory 2506 (e.g., flash memory, static random-access memory (SRAM), etc.), and a data storage system 2510, which communicate with each other via a bus 2530.

The processing device 2502 represents one or more general-purpose processing devices such as a microprocessor, a central processing unit, or the like. More particularly, the processing device is a microprocessor or a processor implementing other instruction sets, or processors implementing a combination of instruction sets. Or, the processing device 2502 is one or more special-purpose processing devices such as an application specific integrated circuit (ASIC), a field programmable gate array (FPGA), a digital signal processor (DSP), network processor, or the like. The processing device 2502 is configured to execute instructions 2514 for performing the operations discussed herein. In some embodiments, the computing system 2500 includes a network interface device 2508 to communicate over the communication network 104 shown in FIG. 1.

The data storage system 2510 includes a machine-readable storage medium 2512 (also known as a computer-readable medium) on which is stored one or more sets of instructions 2514 or software embodying any one or more of the methodologies or functions described herein. The instructions 2514 also reside, completely or at least partially, within the main memory 2504 or within the processing device 2502 during execution thereof by the computing system 2500, the main memory 2504 and the processing device 2502 also constituting machine-readable storage media.

In some embodiments, the instructions 2514 include instructions to implement functionality corresponding to any one of the computing devices, data processors, user interface devices, I/O devices, and sensors described herein. While the machine-readable storage medium 2512 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Also, as shown, computing system 2500 includes user interface 2520 that includes a display, in some embodiments, and, for example, implements functionality corresponding to any one of the user interface devices disclosed herein. A user interface, such as user interface 2520, or a user interface device described herein includes any space or equipment where interactions between humans and machines occur. A user interface described herein allows operation and control of the machine from a human user, while the machine simultaneously provides feedback information to the user. Examples of a user interface (UI), or user interface device include the interactive aspects of computer operating systems (such as GUIs), machinery operator controls, and process controls. A UI described herein includes one or more layers, including a human-machine interface (HMI) that interfaces machines with physical input hardware such as keyboards, mice, or pads, and output hardware such as monitors, speakers, and printers. In some embodiments, such a UI also includes a device that implements an HMI—also known as a human interface device (HID). In some embodiments, a GUI, which is composed of a tactile UI and a visual UI capable of displaying graphics, or any other type of UI presents information to a user of the system related to systems and methods for LIDAR detection of path and landing position of crop material expelled from a forage harvester and use of such information as feedback for operating the harvester or the receiving vehicle. In some embodiments, sound is added to a GUI, such that the UI is a multimedia user interface (MUI) that provides information related to systems and methods for crop row guidance. UI described herein also include virtual reality or augmented reality aspects, in some examples.

Also, as shown, computing system 2500 includes sensors 2522 that implement functionality corresponding to any one of the sensors or cameras disclosed herein (e.g., see LIDAR system 116 and camera 117). In some embodiments, the sensors 2522 include a LIDAR system that implements LIDAR functionality in any one of the methodologies described herein. In some embodiments, the sensors 2522 include a device, a module, a machine, or a subsystem that detect objects, events or changes in its environment and send the information to other electronics or devices, such as a computer processor or a computing system in general. In some embodiments, the sensors 2522 additionally include a position sensor, a linear displacement sensor, an angular displacement sensor, a pressure sensor, a load cell, or any other sensor useable to sense a physical attribute of an agricultural vehicle related to driving and steering of the vehicle or related to control of a discharge chute, or any combination thereof.

In some embodiments, a system of the technologies described herein includes a controller of an agricultural vehicle. The system also includes one or more sensors and cameras of the vehicle connected to the controller. In some embodiments, the combination of the sensor(s) and camera(s) as well as the controller perform the steps of the methods described herein to provide LIDAR detection of path and landing position of crop material expelled from a forage harvester and use of such information as feedback for operating the harvester or the receiving vehicle. In some embodiments, such information is outputted to the operator, via a user interface (UI), such as via user interface 2520. The output to the operator is provided in real time during operation of the vehicle, for example. In some embodiments, the determined information is determined using machine learning or the determined information is enhanced via machine learning. The signal processing described herein also incorporates machine learning in some embodiments.

In some examples, the informational output is displayed to a user via a UI to enhance operations of the vehicle manually or is used as feedback information to the controller so that the controller automatically enhances operations of the vehicle with or without manual input. E.g., see FIGS. 18, 19, and 24, which is an illustration of a GUI providing such information to guide an operator of the harvester or the receiving vehicle.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a predetermined result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that these and similar terms are to be associated with the appropriate physical quantities and are merely convenient labels applied to these quantities. The present disclosure can refer to the action and processes of a computing system, or similar electronic computing device, that manipulates and transforms data represented as physical (electronic) quantities within the computing system's registers and memories into other data similarly represented as physical quantities within the computing system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computing system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description herein. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computing system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

While the invention has been described in conjunction with the specific embodiments described herein, it is evident that many alternatives, combinations, modifications and variations are apparent to those skilled in the art. Accordingly, the example embodiments of the invention, as set forth herein are intended to be illustrative only, and not in a limiting sense. Various changes can be made without departing from the spirit and scope of the invention.

What is claimed is:

1. An apparatus, comprising:
   a camera, configured to capture image data of a receiving vehicle and a self-propelling vehicle moving the receiving vehicle that is near a harvester;
   a LIDAR system, configured to:
      scan in coordinates of parts of the receiving vehicle and the self-propelled vehicle; and
      scan in coordinates of a distribution of crop material in the receiving vehicle; and
   a computing system, configured to:
      convert the scanned in coordinates of the receiving vehicle, the self-propelled vehicle and the distribution of crop material into a point cloud;
      detect an image of the receiving vehicle from the image data;
      generate a bounding box that surrounds the detected imaged of the receiving vehicle, wherein the bounding box is either a rectangular cuboid or a rectangle;
      detect boundaries of the receiving vehicle using edge detection, within the generated bounding box;
      estimate fill level based on the detected boundaries and the point cloud;
      time-match the captured image data and the point cloud to provide time-matched data;
      extract a receiving vehicle portion of the point cloud based on the time-matched data and the detected image of the receiving vehicle;
      estimate dimensions and orientation of the receiving vehicle based on the point cloud; and
      generate graphical representations of the estimated fill level and the estimated dimensions and orientation of the receiving vehicle to be displayed on a screen simultaneously.

2. The apparatus of claim 1,
   wherein the LIDAR system is configured to:
      scan in a crop material flow expelled from a spout of a discharge chute of the harvester;
   wherein the computing system is configured to:
      determine a crop material path by extrapolating points along an arc formed by the scanned in crop material flow;
      determine a landing point of the expelled crop material flow by curve fitting the determined crop material path to a point of intersection with a surface of the receiving vehicle, based on the estimated dimensions and orientation of the receiving vehicle; and
      generate a graphical representation of the determined crop material path and the determined landing point along with the estimated fill level and the estimated dimensions and orientation of the receiving vehicle to be displayed on the screen simultaneously.

3. The apparatus of claim 2, wherein the computing system is configured to:
   detect an image of the spout from the captured image data;
   generate a second bounding box that surrounds the detected imaged of the spout;
   detect boundaries of the spout using edge detection, within the generated second bounding box;
   extract a spout portion of detected coordinates in the detected crop material flow, based on the time-matched data and the detected image of the spout;
   estimate dimensions and orientation of the spout based on the extracted spout portion of the detected coordinates in the scanned in crop material flow; and
   generate a graphical representation of the estimated dimensions and orientation of the spout along with the estimated fill level and the estimated dimensions and orientations of the receiving vehicle to be displayed on the screen simultaneously.

4. The apparatus of claim 1, wherein the computing system is configured to:
   detect an image of the self-propelled vehicle moving the receiving vehicle from the captured image data;
   generate a second bounding box that surrounds the detected imaged of the self-propelled vehicle;
   detect boundaries of the self-propelled vehicle using edge detection, within the generated second bounding box;
   extract a moving vehicle portion of the point cloud, based on the time-matched data and the detected image of the self-propelled vehicle;
   estimate dimensions and orientation of the self-propelled vehicle based on the extracted moving vehicle portion of the point cloud; and
   generate a graphical representation of the estimated dimensions and orientation of the self-propelled vehicle along with the estimated fill level and the estimated dimensions and orientation of the receiving vehicle to be displayed on the screen simultaneously.

* * * * *